United States Patent
Schlapp et al.

(10) Patent No.: US 6,954,072 B1
(45) Date of Patent: Oct. 11, 2005

(54) PROCEDURE AND DEVICE FOR RADIATING AND DETECTING THE PLURALITY OF FREQUENCIES OF ELECTRONIC MARKERS

(75) Inventors: Hubert Schlapp, Ebern (DE); Richard Allin, Baunach (DE)

(73) Assignee: Seba Dynatronic Messund Ortungstechnik GmbH, Baunach (DE)

(*) Notice: Subject to any disclaimer, the term of this patent is extended or adjusted under 35 U.S.C. 154(b) by 0 days.

(21) Appl. No.: 10/227,149

(22) Filed: Aug. 22, 2002

(51) Int. Cl.⁷ .............................................. G01V 3/08
(52) U.S. Cl. ...................................................... 324/329
(58) Field of Search ................................. 324/326–329

(56) References Cited

U.S. PATENT DOCUMENTS

| | | | |
|---|---|---|---|
| 4,188,629 A | * | 2/1980 | Johnson ........................ 342/46 |
| 4,642,786 A | * | 2/1987 | Hansen ......................... 702/153 |
| 4,673,932 A | * | 6/1987 | Ekchian et al. ........... 340/10.32 |
| 5,045,368 A | | 9/1991 | Cosman et al. ............. 428/34.1 |
| 5,430,379 A | | 7/1995 | Parkinson et al. ........... 324/329 |
| 6,049,279 A | | 4/2000 | Minarovic ................. 340/572.8 |
| 6,053,260 A | | 4/2000 | Boon et al. ..................... 173/90 |
| 6,130,539 A | | 10/2000 | Polak .......................... 324/326 |
| 6,133,738 A | | 10/2000 | Minarovic ................... 324/326 |
| 6,246,328 B1 | | 6/2001 | Parkinson et al. ......... 340/572.1 |
| 6,271,667 B1 | | 8/2001 | Minarovic ................... 324/326 |
| 6,377,203 B1 | | 4/2002 | Doany .......................... 342/44 |

OTHER PUBLICATIONS

"Metro Mark™ Marker Locating System" *Metrotech®*.
"RD400PXL2-4M/PDL2-4M Precision locator with Passive Marker" Technical specification, *Radiodetection*.
"Omni Marker Electronic Marker™", downloaded Dec. 4, 2001 from <http://www.indtech.com/OMNI.HTM>, *Electronic Omni Marker*.
"Metro Mark Locating System", downloaded Dec. 4, 2001 from <http://www.pollardwater.com/emarket/Pages/Metromark.asp>, *Joseph G. Pollard Company, Inc.* (1999).

* cited by examiner

Primary Examiner—Jay Patidar
(74) Attorney, Agent, or Firm—Finnegan, Henderson, Farabow, Garrett & Dunner, L.L.P.

(57) ABSTRACT

A procedure and a system for the detection of a plurality of passive electronic markers are disclosed. A marker location device capable of scanning for multiple types of electronic marker thereby increasing operator efficiency and reducing erroneous marker indications is described. In some embodiments, scanning may be performed at the operating technician's direction or may be performed in the background while the operating technician is performing other tasks.

37 Claims, 20 Drawing Sheets

PROCEDURE AND DEVICE FOR RADIATING AND DETECTING THE PLURALITY OF FREQUENCIES OF ELECTRONIC MARKERS

CROSS-REFERENCE TO CD-ROM APPENDIX

CD-ROM Appendix A, which is a part of the present disclosure, is a CD-ROM appendix consisting of two (2) text files. CD-ROM Appendix A contains, two computer program listings for embodiments of controllers of a marker locator as described below. The total number of compact disks including duplicates is two. The attached CD-ROM Appendix A is a CD-ROM formatted for an IBM-PC operating a Windows operating system. Appendix B, which is part of the present specification, contains a list of the files included on the compact disk.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

These and other embodiments are further discussed below.

BACKGROUND

1. Field of the Invention

The present invention relates to the detection of concealed electronic markers, and specifically, to a procedure and device for discriminating among a plurality of buried electronic markers.

2. Discussion of Related Art

Utility conduits are often buried underground or concealed in walls and not readily accessible. It is often necessary to locate these concealed utility conduits in order to repair and replace them. It is also important to know the location of utility conduits in order to avoid them while excavating an area. Examples of hidden utility conduits include pipelines for gas, sewage or water and cables for telephone, television or power.

There are various ways to locate concealed objects, for example, using line locators or marker locators. Line locators are appropriate when seeking electrically conductive objects, such as metallic pipelines and cables. Line locators may also be used for finding non-electrically conducting conduits when the conduit is marked with a conducting trace wire or trace tape buried along the conduit. The process of applying an AC signal to the conductor at an accessible point and detecting the resulting electromagnetic radiation is well known in the art. When an AC signal is applied, the conductor acts as an antenna radiating an electromagnetic field along its entire length.

A line locator used above ground detects electromagnetic emissions from conductors underground. A disadvantage with relying solely on the line locator device is that it may fail to identify and distinguish among various utility conduits and conductors. Additionally, line locator devices can not be used to locate non-conductive lines, such as, for example, gas lines, fiber optic lines and plastic water lines when not marked with trace wires.

Conduits may also be marked with electronic markers, either at surface level or underground. Buried electronic markers may be used to locate and identify a number of concealed objects such as cables, pipes, access points, underground stock piles, survey points and septic tanks.

Generally, electronic markers consist of two types, namely, active markers and passive markers. Active markers radiate a signal detectable at the surface; however, they require a power source. Passive markers, on the other hand, require no power source and become active when induced by an external electromagnetic field, which can be generated with a portable source.

A marker locator is a device for detecting and determining the location of concealed or buried markers. Passive markers typically include a multi-turn wire loop (coil) tuned with a capacitor to a pre-determined resonant frequency.

FIG. 1 illustrates a marker locator as operated by a location technician. Location technician 6 holds marker locator 1 directed towards ground level 7 to find the location of hidden passive markers 10 and 12. The hidden passive markers 10 and 12 can each be coded with a resonant frequency in order to identify the type of utility lines 11 and 13 that each frequency respectively marks.

Commonly, a passive marker is the combination of a wire coil and a capacitor enclosed within a non-metallic protective enclosure. The combination creates an inductance-capacitance (LC) circuit defined by an inductance developed by the wire coil and a capacitance held by the capacitor. The LC circuit operates in a resonance mode at its resonant frequency f given by the equation:

$$f = \frac{1}{2\pi\sqrt{LC}} \quad \text{(Equation 1)}$$

where L is the inductance of the wire coil and C is the capacitance of the capacitor.

FIG. 2A shows an example of a ball-type passive marker. Passive marker 10 is a spherical passive marker housing three LC circuits 10A, 10B and 10C. The coils of each LC circuit 10A, 10B and 10C are positioned in orthogonal Cartesian planes such that the three tuned circuits produce a uniform radio frequency (RF) field.

FIG. 2B shows a disk-type passive marker. Passive marker 12 is a flat passive marker housing a single LC circuit 12A with the coil positioned in the horizontal X-Y plane.

FIG. 3 shows the electrical schematic diagram of a single LC circuit. The coil acts as an inductor 16, and is connected in parallel with a capacitor 18 to form a resonant tank circuit 14. The frequency f of the passive marker is set by the resonant frequency of the passive LC circuit, which can be tuned to a preset value.

Different types of utility lines are each associated with unique resonate frequency values. Markers with different resonant frequencies may also be colored for quick identification when installed. Six distinct frequency/color combinations are commonly used: 77.0 kHz (Orange/Black) for Canadian telephone and Cable TV; 83.0 kHz (Yellow) for Gas; 101.4 kHz (Orange) for Telephone; 121.6 kHz (Green) for Sanitary/Waste water; 145.7 kHz (Blue) for Water; and 169.8 kHz (Red) for Power. Of course, these frequencies (and colors) have been designated by conventional use and are not meant to be restrictive.

Though passive electronic markers have several advantages over tracing wires, they are still subject to certain limitations. One such problem is the time consumed by separate searches for each type of marker. Another such problem is the "neighbor detection" problem where emissions of marker-types not being searched for overwhelm the receiver producing false-positive indications. A similar problem is the "near-far" problem where emissions from nearby markers can override signals from the farther placed marker possibly producing an erroneous marker indication.

In light of the foregoing description, it would be desirable to devise an improved method for locating markers. It would also be desirable to reduce the occurrence of erroneous marker indications. It would be further advantageous if a method existed that could facilitate detection of all markers in a given area more quickly than is conventionally known.

SUMMARY

In accordance with the present invention, a marker locator system that can scan for multiple marker types and a method to scan for multiple marker types are presented.

In some embodiments, the marker locator scans at the operator's request. In some embodiments, the marker locator scans in the background during the "idle" times of the marker locator. A marker locator according to the present invention includes (1) a transmitter stage capable of transmitting electromagnetic radiation at one or more of a plurality of fixed frequencies; (2) a receiver stage capable of receiving electromagnetic radiation from one or more of a plurality of fixed frequencies; and (3) a processor coupled to the transmitter and receiver stages, wherein the transmitter stage scans through a plurality of fixed frequencies in response to the processor.

In some embodiments, a marker locator includes: (1) a base subsection including a transmit antenna and a receive antenna; (2) a shaft coupled to the base subsection; (3) a top assembly coupled to the shaft, wherein the top assembly includes a control panel, the control panel includes a display screen and input buttons; and (4) electronic circuitry mounted in the base subsection, the shaft and the top assembly, wherein the electronic circuitry includes: (4a) a transmitter stage including a transmitting antenna; (4b) a receiver stage including a receiving antenna; and (4c) a processor electrically coupled to the transmitter stage and to the receiver stage.

In some embodiments, a marker locator includes a means for scanning a set of a plurality of marker frequencies, a means for generating a transmit pulse at one of the set of the plurality of marker frequencies, a means for transmitting the transmit pulse, and a means for receiving responses from one or more markers.

In some embodiments, a method of locating markers includes: transmitting a first pulse, the first pulse including electromagnetic radiation of a first frequency appropriate for a first marker type; receiving responses from one or more markers; and detecting a first marker response appropriate for the first marker type.

In some embodiments, a method of locating markers includes: performing a primary scan with a first set of sinusoidal waves of a first set of frequencies appropriate for a first set of marker types; and performing a background scan with a second set of sinusoidal waves of a second set of frequencies appropriate for a second set of marker types.

These and other embodiments are further discussed below with respect to the following figures.

In the figures, elements having the same designation have the same or similar functions.

DETAILED DESCRIPTION

Figure 2A:
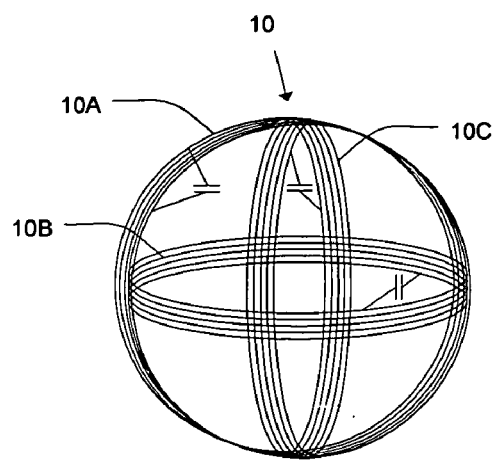
FIG. 2A shows an example of a ball-type passive marker.
Figure 2B:
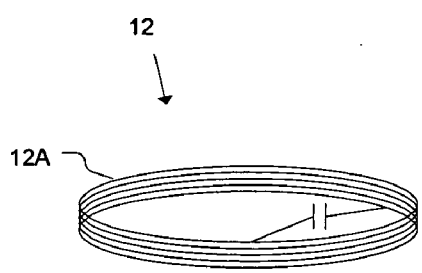
FIG. 2B shows an example of a disk-type passive markers.
Figure 3:
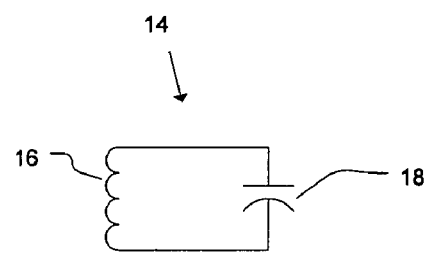
FIG. 3 shows the electrical schematic diagram for a single LC circuit of a passive marker.

A passive marker as shown in FIGS. 2A and 2B is self-contained, with no accessible physical connections. Radiating a signal from marker locator 1 towards the area where the marker is located activates the passive marker. As discussed above, a passive marker (marker 10 in FIG. 2A or 12 in FIG. 2B) absorbs and re-radiates electromagnetic energy radiated from marker locator 1 that falls within its resonant band as defined by the passive marker's LC circuit shown in FIG. 3.

Figure 4:
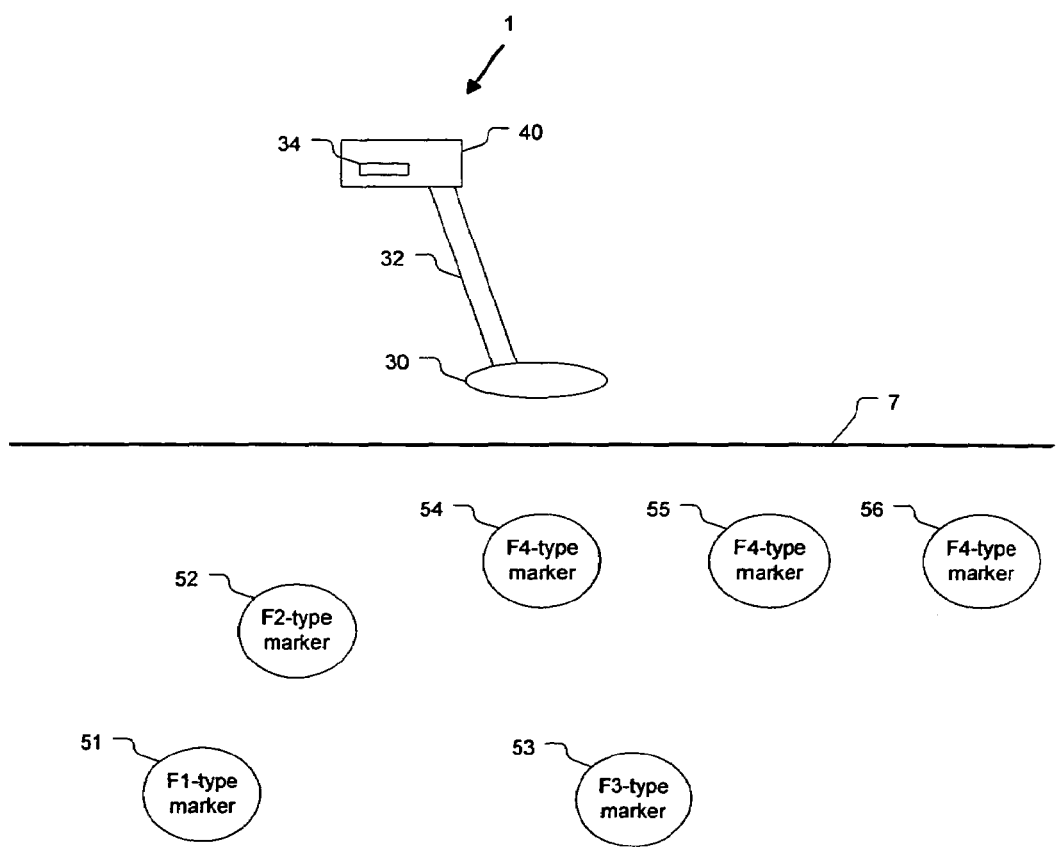
FIG. 4 shows a marker locator in a typical application scenario according to the present invention.

FIG. 4 shows a marker locator in a typical application scenario according to the present invention. Marker locator 1 includes a base subsection 30 with transmit and receive antennas. In some embodiments, both transmit and receive antennas can be combined into a single antenna housed in base subsection 30. Base subsection 30 is attached to shaft 32. Shaft 32 holds top assembly 40 and handles 34 for location technician 6 to carry marker locator 1. The front panel display can be integrated into top assembly 40, into base subassembly 30 or remotely situated. The electronic circuitry of marker locator 1 can be distributed among the base subsection 30, shaft 32 and top assembly 40. Alternatively, the hardware of marker locator 1 can be vehicle mounted rather than portable.

FIG. 4 also shows several markers of various types in the vicinity of marker locator 1. Markers with absorption bands centered at frequencies $f_1$, $f_2$ and $f_3$ are shown although any number of markers, each of which can be activated at a particular center frequency, can be present. For example, F1-type marker 51 may mark a gas utility line, F2-type marker 52 may mark an underground power utility line, F3-type marker 53 may mark a water main and F4-type markers 54, 55 and 56 may mark three spots adjacent to a sanitary water main.

Figure 5:
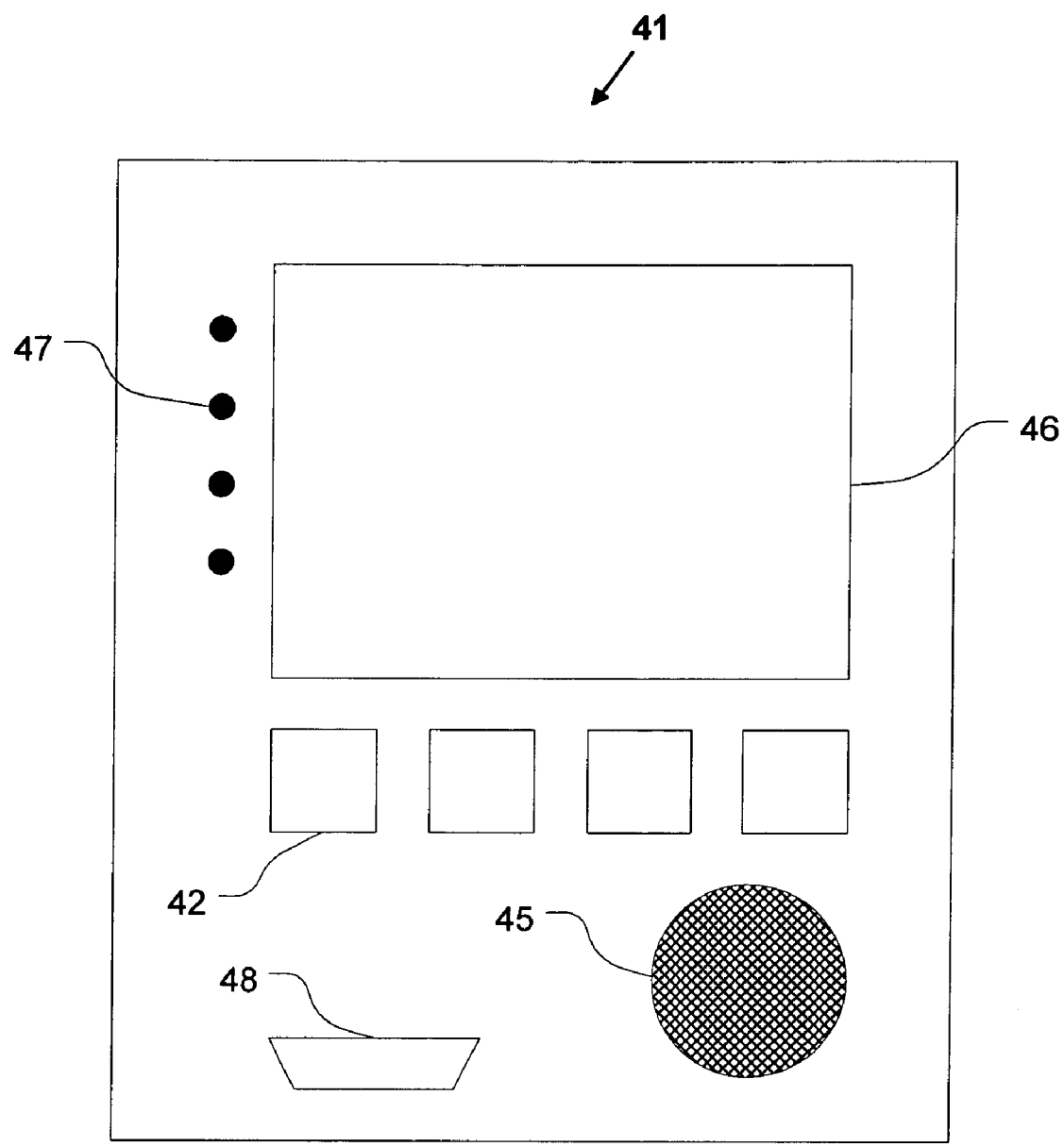
FIG. 5 shows a diagram of a control panel of a marker locator according to the present invention.

FIG. 5 shows a diagram of a front control panel 41 for an embodiment of marker locator 1. As discussed above, control panel 41 may be dispersed throughout marker locator 1, may be incorporated into top assembly 40 of marker locator 1, or may be separated and electrically coupled to marker locator 1. Control panel 41 can allow location technician 6 to input data and control the operation of marker locator 1. Input 42 can include, for example, input buttons 42, keypad, and/or keyboard devices. Control panel 41 can provide location technician 6 with outputs to receive information from marker locator 1. Outputs can include, for example, speakers 45, screen display 46, and LEDs 47. A touch screen can be used as display 46 to combine input and output functions in a single device. Additionally, port 48 may be used to interface to external devices to control and receive data from marker locator 1, for example keyboards or computers.

During the period while marker locator 1 transmits a signal near a passive marker, that passive marker accepts, accumulates and re-radiates energy within its resonant frequency bandwidth. When the transmitter of marker locator 1 turns off, the marker continues to emanate energy that was still stored; however, the intensity of the emitted radiation is exponentially decaying. When the receiver of marker locator 1 detects the re-radiated energy from the passive marker, marker locator 1 alerts location technician 6 of the presence of a detected marker.

Figure 6A:
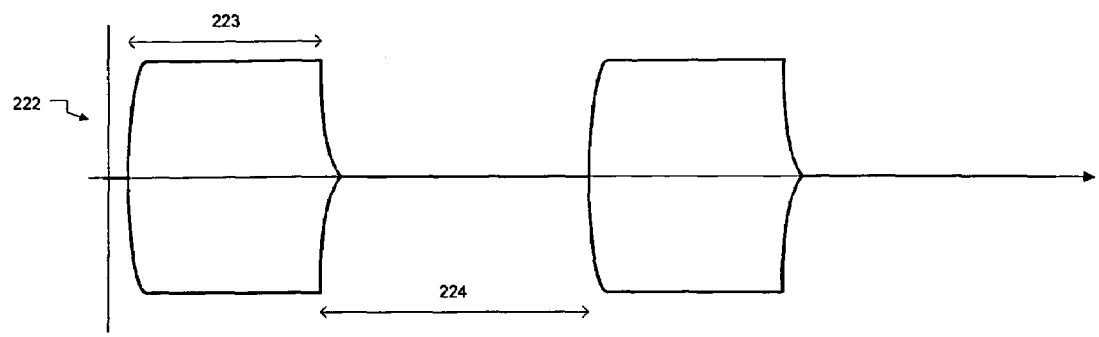
FIGS. 6A and 6B show the temporal relationship between a transmitted signal from the transmitter stage of FIG. 10 and a passive marker's reflected signal.
Figure 6B:
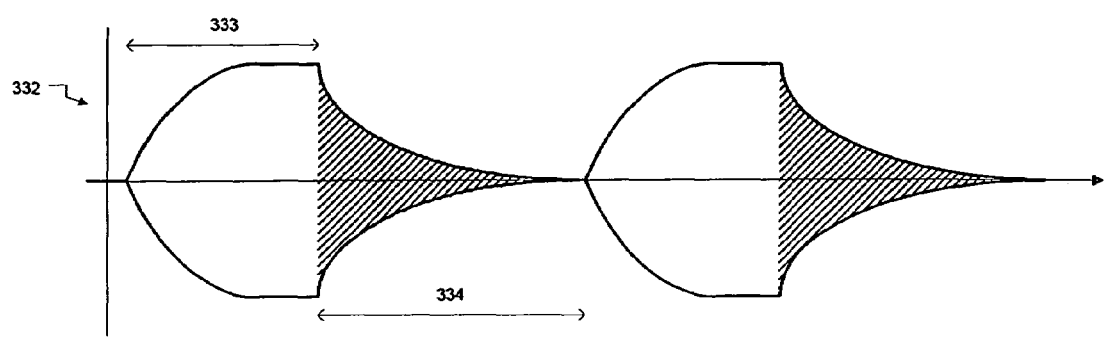

FIGS. 6A and 6B show the temporal relationship between the transmitted signal 222 from marker locator 1 and the emitted signal 332 from a passive marker, for example, marker 52. FIG. 6A shows the envelope of the sinusoidal transmit signal of the transmitter. FIG. 6B shows the envelope of the relatively weaker sinusoidal signal emanating from the passive marker. As the transmitter pulse 223 excites the passive marker, the passive marker accepts, accumulates and re-radiates energy 333. During transmitter pause 224, the passive marker stops accumulating energy but continues to emanate energy in the form of a proportionally decaying electromagnetic field 334. Marker locator 1 can tune to receive radiation field 334 emanated by, potentially, each of a plurality of passive markers (e.g., markers 51 through 55 in FIG. 4). The width of pulse 223 and the width of pause 224 are each typically longer than the LC time constant of a marker LC circuit on one of markers 51 through 55.

Conventional marker locators are designed to search for only a single type of marker during the marker search process. To search for two different types of markers, location technician 6 performs multiple steps: (1) manually select the first type of marker; (2) perform a first physical search of the area for the first type of marker; (3) manually select a second type of marker to search; and then (4) repeat the physical sweep of the area for the second type of marker.

With embodiments of the present invention, marker locator 1 may search for a plurality of marker types without intermediate operator intervention. Marker locator 1 allows location technician 6 to search for two or more marker types during a single physical sweep. Marker locator 1 can alternatively sweep through a range of frequencies rather than a set of distinct frequencies. The list or range of marker types can be defined within marker locator 1, can be defined by or selected by location technician 6, or can be remotely set though an interface to an external device. Marker locator 1 according to the present invention can include multiple modes and features, including foreground-scan, background-scan and neighbor-detection. Marker locator 1 can perform foreground-scan. A foreground-scan feature can allow location technician 6 to define a primary list of marker types. Marker locator 1 uses the primary list when determining the frequency to transmit in a pulse of energy. Marker locator 1 can send a first pulse with a frequency representing the first marker type on the primary list. Marker locator 1 can then send a second pulse with a second frequency representing the second marker type on the primary list. Marker locator 1 continues the process until all frequencies representing each marker type in the primary list has been transmitted. Marker locator 1 then repeats the process until location technician 6 terminates the foreground-scan.

Figure 6C:
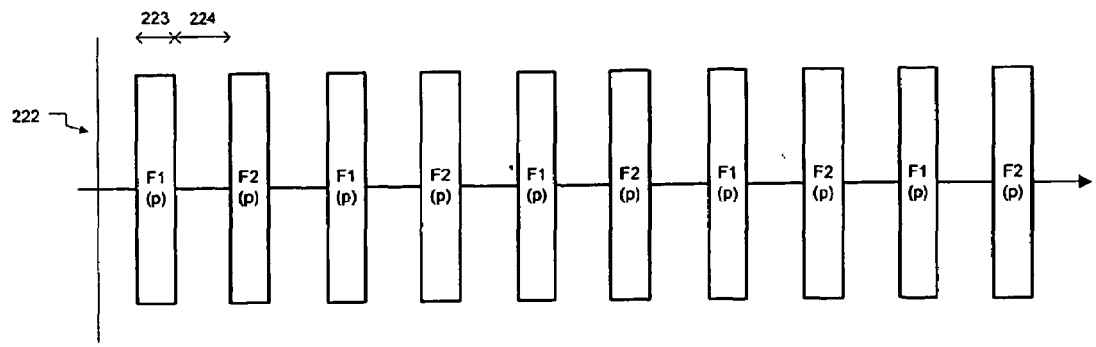
FIGS. 6C, 6D and 6E show transmitted signals containing primary, background and neighbor pulses.

FIG. 6C shows the envelope of a transmitted signal during a foreground-scan operation. Marker Locator 1 transmits a series of primary pulses (p). For example, the primary list contains two marker types, F1-type and F2-type. Marker locator 1 will transmit a primary pulse (p) with a frequency representing the first marker type (F1). Marker locator 1 will then transmit a primary pulse (p) with a frequency representing the second marker type (F2). Alternatively, marker locator 1 can send a fixed number of primary pulses (p) of each maker type before advancing to the next marker type on the primary list. Marker locator 1 continues the process until location technician 6 terminates the foreground-scan operation.

In some embodiments, marker locator 1 can perform background-scan. A background-scan feature can allow location technician 6 to scan for marker types when not scanning for marker types defined by location technician 6. Background scanning may be performed based on a time schedule, based on signal received, or based on depth measurements as described below.

The background-scan feature allows location technician 6 to define a background list of marker types. Marker locator 1 uses both the foreground list and the background list when determining the frequency to transmit in a pulse of energy. As with the foreground mode, marker locator 1 sends a series of primary pulses (p); however, the series is periodically interrupted by a background pulse (b). Primary pulses (p) represent marker types from the primary list. Background pulses (b) represent marker types from the background list. Marker locator 1 allocates a majority of pulse slots to the primary pulse sequence and a minority of slots to the background sequence. Marker locator 1 continues transmitting primary pulses and background pulses in their respective pulse slots until location technician 6 terminates the background-scan operation.

Figure 6D:
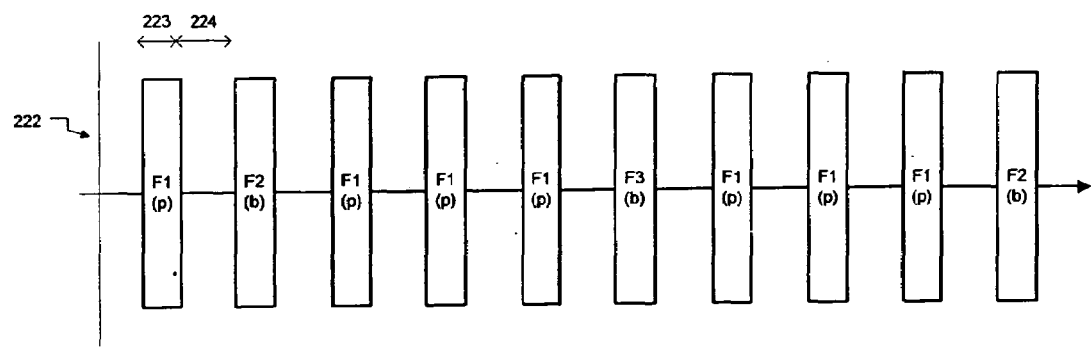

FIG. 6D shows the envelope of a transmitted signal during a background-scan operation base on a time schedule. As described above, marker locator 1 transmits a sequence of primary pulses (p) and background pulses (b). FIG. 6D shows a primary list containing a single marker type, F1, and a background list containing two marker types, F2 and F3. Marker locator 1, in the example shown in FIG. 6D, has allocated 3 of 4 pulse slots to primary pulses (p) and 1 of 4 pulse slots to background pulses (b). During each primary pulse (p) time slot, marker locator 1 transmits a frequency pulse representing the next marker type on the primary list. Here, the primary list contains a single marker type, therefore each primary pulse (p) contains a frequency representing the F1 marker type. Similarly, during each background pulse (b) time slot, marker locator 1 transmits a frequency pulse representing the next marker type on the background list. Here, the background list contains two marker types, therefore every second background pulse (b) contains a frequency representing the F2 marker type and every other background pulse (b) contains a frequency representing the F3 marker type.

In some embodiments, marker locator 1 can perform neighbor detection. A neighbor detection feature can allow location technician 6 to configure marker locator 1 to scan for neighboring marker types. Initially, marker locator 1 receives an initial response from a marker indicating a first marker type. By checking for neighboring marker types, marker locator 1 can increase the certainty of the initial response or can report that a marker of a neighboring marker type exists. By determining if a marker of a neighboring marker type caused the initial response, marker locator 1 can reduce erroneous indications provided to location technician 6.

Figure 6E:
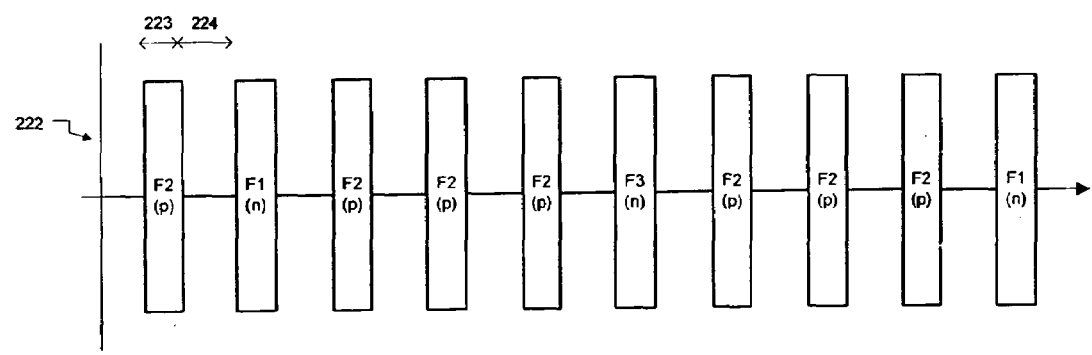

FIG. 6E shows the envelope of a transmitted signal during a neighbor detection operation. Marker locator 1 can amend the primary list entered by location technician 6 with a list of neighboring marker types. The neighboring marker types are those marker types that lie adjacent to the marker types in the primary list entered by location technician 6. For example, if the primary list contains a marker type of F2, then neighbors to F2, i.e., F1 and F3, would be included in a neighbor list. If the neighbor is already contained in a primary list, then the neighbor would not necessarily need to be in the neighbor list. Marker locator 1 can append the primary list with the list of neighbors. Alternatively, marker locator 1 can append or replace the background list with the neighbor list. FIG. 6E shows a series of three primary pulse (p) representing the F2 marker type from the primary list. The figure also shows that after each series of primary pulse (p), marker locator 1 transmits a neighbor pulse (n) representing the next marker type on the background list. With a primary list containing F2, a neighbor list containing F1 and F3, neighbors of F2, and a ratio between primary and neighbor pulses of 3 to 1, marker locator 1 sends the sequence F2 (p), F2 (p), F2 (p), F1 (b), F2 (p), F2 (p), F2 (p), F3 (b), then repeats the sequence until location technician 6 terminates the neighbor detection operation.

Embodiments of the present invention can include any combination of pulses corresponding to the frequencies of the various markers. In general, a primary list of markers is scanned. In the background, between pulses at frequencies corresponding to markers on the primary list, pulses with frequencies corresponding to markers on a background list and possibly near neighbors occur with less frequencies than pulses corresponding to markers on the primary list.

Utilizing some embodiments of the present invention, location technician 6 performs a single sweep for all selected markers rather than multiple sweeps for each marker type. As the technician performs the sweep of the area under search, marker locator 1 automatically cycles through the various marker resonant frequencies without additional operator intervention. In some embodiments, scanning of five discrete frequencies can take approximately 600 milliseconds each spatially located in the scan.

In some embodiments, marker locator 1 indicates to location technician 6 that marker locator 1 has completed one search cycle therefore directing the technician to move to the next physical location. The indication can be an audio indication, such as a beep from a speaker, or a visual indication, such as a flash from an LED or text and graphics on an LCD display.

When scanning for multiple marker types, embodiments of marker locator 1 can search for multiple marker types sequentially, in parallel or in a hybrid fashion.

To search sequentially, marker locator 1 searches each marker type in a sequential fashion. After each marker type has been searched, marker locator 1 advances to the first marker type, repeating the cycle. For example, if searching for F1, F2 and F3-type markers, marker locator 1 first transmits and "listens for" F1-type markers. Marker locator 1 emits an electromagnetic radiation pulse 223 containing a single predetermined resonant frequency for the F1-type marker followed by a pause 224 between pulses 223. Marker locator 1 then advances to transmit and "listen for" F2-type markers, then in-turn F3-type markers. After completing the search for the last marker type, marker locator 1 begins the process again with the F1-type marker search. Before marker locator 1 advances to the next marker type search, marker locator 1 performs an individual marker-type search that can consist of the transmission of a single pulse or can consist of the transmission of a series of pulses. When a scan is complete at a particular location, marker locator 1 may wait for location technician 6 to relocate before the next scan is started.

To search in parallel, marker locator 1 utilizes a comb transmitter. A comb transmitter combines multiple sinusoidal signals at discrete frequencies into a single signal. To allow enough energy to pass to a marker, more power is required than with the single frequency signals of the sequential search described above. The combined multiple frequency signal may be constructed with out-of-phase resonant frequency signals to accommodate the dynamic range of marker locator 1 transmitter. Marker locator 1, thereby, searches for multiple types of markers with each transmitted pulse 223. Pulse 223 contains a set of predetermined resonant frequencies followed by a pause 224 between pulses 223. Marker locator 1 combines the individual marker type pulse signals of each of the marker types to be searched into a single pulse 223, thus multiple marker types, if present, will activate and response to pulse 223.

To search in a hybrid fashion, marker locator 1 incorporates a combination of serial and parallel methods described above. That is, marker locator 1 subdivides the search list into two or more subgroups of marker types to search. A first pulse 223 or first series of pulses 223 contain a first subgroup of predetermined resonant frequencies representing the first subgroup of marker types being searched. The next pulse 223 or series of pulses 223 contain the next subgroup of frequency components representing the next group of marker types being to search. The process of searching for subsets of marker types is repeated once all marker types have been searched.

As previously discussed, marker locator 1 can perform a primary-scan among a predetermined or technician defined plurality of marker types. Marker locator 1 can supplement the primary-scan with a secondary-scan of marker types not included in the primary-scan. The secondary-scan can include all or just some of the other marker types not included in the primary-scan. The secondary-scan can include, for example, just neighboring marker types as described below.

Marker locator 1 can scan a primary subset of marker types selected by location technician 6. For example, if a single utility provider maintains both cable TV lines as well as telephone lines, location technician 6 may set up a limited type list to scan. If searching for cable TV and telephone lines, location technician 6 can configure marker locator 1 to scan for both cable TV and telephone line type markers.

On the other hand, if preparing to excavate an area for new cable TV and telephone lines, location technician 6 would want to know what other hazards exists. Location technician 6 can configure marker locator 1 to scan for all but cable TV and telephone line type markers by enumerating all other marker types individually. Alternatively, location technician 6 can create a do-not-search list. Location technician can enable marker locator 1 to search for all marker types except for those marker types enumerated on the do-not-search list.

In some embodiments, marker locator 1 also scans for neighboring marker types. Neighboring marker types are those marker types that are higher and lower in resonant frequency compared to the marker types selected by location technician 6. Immediate neighboring marker types are those marker types that are next higher and next lower in resonant frequency. With an immediate neighbor mode enabled, marker locator 1 conducts a search that includes both selected and immediate neighboring marker types. For example, if scanning at a first frequency, marker locator 1 also scans at adjacent frequencies belonging to marker types just higher and just lower in frequency. Thus, marker locator 1 can perform a search for marker types not specifically selected for location.

For the following immediate neighbor marker search example, assume that only five marker types exist. These five marker types have associated sequential resonant frequencies $f_1$, $f_2$, $f_3$, $f_4$ and $f_5$ having F1, F2, F3, F4 and F5-type markers, respectively. If the primary search involves the F2-type marker, marker locator 1 will perform a secondary search for neighbors for both F1 and F3-type markers. If the primary search involves both F2 and F3-type markers, marker locator 1 will perform a secondary search for neighbors for both F1 and F4-type markers. If the primary search involves F1, F3 and F5-type markers, marker locator 1 will perform a secondary search for neighbors for both F2 and F4-type markers. Marker locator 1 can perform the primary search and secondary search in series, in parallel or in a hybrid fashion as described above.

In some embodiments, in addition to scanning for immediate neighbors, marker locator 1 can search for all marker types multiple marker types away. Some embodiments of marker locator 1 can conduct a search that includes both selected marker types and multiple neighboring marker types to each side of the selected marker types. For example, if scanning at a first frequency, marker locator 1 also scans at multiple adjacent frequencies belonging to marker types just higher and multiple adjacent frequencies belonging to marker types just lower in frequency. In some embodiments, marker locator 1 can have a variable called neighbor_width representing how wide the neighbor search should be, that is, the number of marker types away from the selected marker types to search. If searching for $f_5$ with a neighbor_width of two, then marker locator 1 will search for neighbors $f_3$, $f_4$, $f_6$ and $f_7$ in addition to the selected marker type $f_5$.

In some embodiments, marker locator 1 scans for all defined marker types. With a scan-all mode enabled, marker locator 1 can search through each discrete marker type resonant frequencies $f_1$, $f_2$, $f_3$ through $f_n$.

In some embodiments, marker locator 1 can use the ability to scan for multiple marker types and neighboring markers to reduce erroneous marker indications. Erroneous marker indications can occur when two or more types of markers lie in one region.

When location technician 6 searches for a particular type of utility line marked with a set of passive markers of one marker type, marker locator 1 will typically transmit and "listen for" the one resonate signal associated with the sought after type of passive marker. As a result, location technician 6 does not intend to activate and detect other types of markers marking other utility lines. For example, if looking for power cable markers at 169.8 kHz, a nearby water main marker, which is tuned to resonate at 145.7 kHz, should not activate, and thus, should not emanate a signal to marker locator 1 within the band of the power cable marker.

In practice, however, the marker positioned near the surface identifying the water main can radiate electromagnetic energy appropriate for the power cable marker. Such saturation may cause a false indication of the presence of the first type of markers. If not compensated, a detector searching for one type of marker may erroneously indicate the presence of that marker due to detection of energy radiated from another type of marker.

Figure 7:
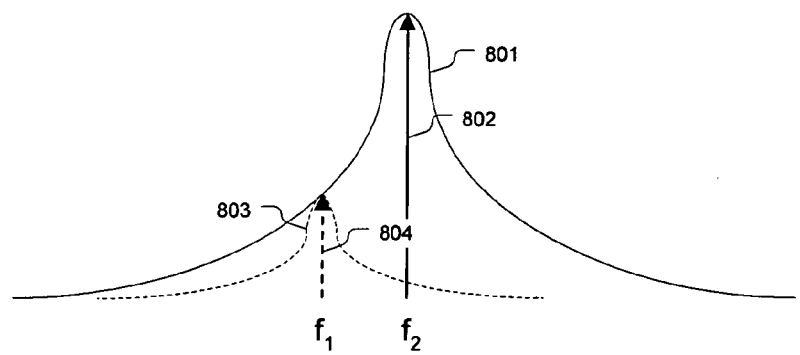
FIG. 7 illustrates the "neighbor detection" problem in locating markers.

FIG. 7 illustrates the "neighbor detection" problem described above. FIG. 7 illustrates the effect of strong signal 801 emanating from an F2-type marker preset to resonant frequency $f_2$ buried near the surface. The absorption band of the F2-type marker can be broad enough to absorb and radiate electromagnetic radiation from marker locator 1 that is set to radiate at frequency $f_1$ appropriate for detection of F1-type markers. The signal received from a marker closer to marker locator 1 can be a stronger signal than the signal received from a more distant marker. Marker locator 1 transmits pulse 223 then pauses 224 before sending the next pulse. During pause 224, the marker detector searches for F1-type markers with energy at resonant frequency $f_1$. Marker locator 1 takes the measurement 804 that may appear to come from an F1-type marker emanating signal 803, but is actually part of the energy spectrum radiated by the F2-type marker.

Marker locator 1 may receive a signal from a marker of a marker type not specifically being searched. If marker locator 1 erroneously detects a marker not being searched, marker locator 1 might provide an erroneous indication.

In order to prevent an erroneous indication, some embodiments of marker locator 1 search for marker signals from markers at neighboring frequencies. In the example of FIG. 7, marker locator 1 searches for neighbors to F1-type markers. Therefore, marker locator 1 searches for F2-type markers. Marker locator 1 takes measurement 802 at frequency $f_2$ indicating the presence of an F2-type marker emanating signal 801. Marker locator 1 can then extrapolate measurement 802 at frequency $f_2$ to obtain a predicted measurement at frequency $f_1$. The measurement at frequency $f_1$ is compared to the predicted measurement based on the strength of the signal radiated at frequency $f_2$. If the signals were substantially equal, marker locator 1 would not indicate an F1-type marker but rather the presence of an F2-type marker. The search of neighbor marker types can continue reiteratively such that if a neighbor is detected, the frequency of the neighbor's neighbor is searched.

Marker locator 1 may receive signals from two or more markers. Again, if searching for one marker type and two markers of different types respond (one being sought after and another marker not being sought after), marker locator 1 might provide an erroneous indication.

Figure 8:
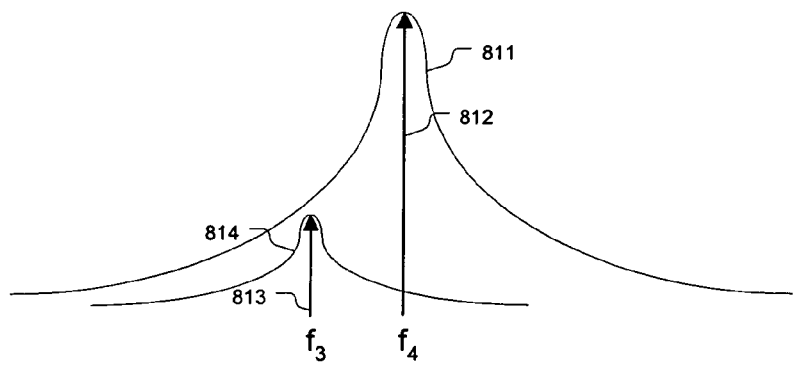
FIG. 8 show an example of the "near-far" problem in locating markers.

FIG. 8 shows, for illustrative purposes, an example of the "near-far" problem. Marker locator 1 has activated an F4-type marker near the surface, thus creating a strong signal 811. Marker locator 1 has also activated a weaker F3-type marker father away than the F4-type marker. Because the F3-type marker is much weaker than the F4-type marker, measurement 812 at frequency $f_4$ contains little contribution from the F3-type marker. However, because the F4-type marker is significantly stronger than the F3-type marker, a measured signal 813 from the F3-type marker emanating signal 814 may be hidden from proper detection unless the F4-type marker is properly considered. In sum, when one marker is buried at a shallow depth in comparison to a second marker, the closer marker may override the dynamic range of marker locator 1 receiver and thus cause erroneous marker indications.

Figure 9:
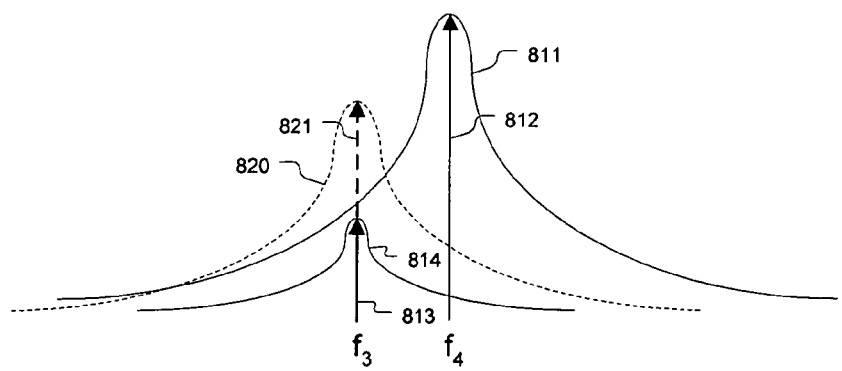
FIG. 9 further expands on the "near-far" problem shown in FIG. 8.

FIG. 9 shows, for illustrative purposes, a continued example of the "near-far" problem as shown in FIG. 8. Consider the situation where location technician 6 seeks to find just F3-type markers. The combined contribution of both weak F3-type marker and strong F4-type marker at frequency $f_3$ results in measurement 821 representing a non-existent signal 820. By searching for markers neighboring F3-type markers, marker locator 1 can determine that measurement 821 is a false reading. By comparing the measurement 821 at $f_3$ with the predicted measurement for signal 811 at $f_3$, marker locator 1 determines that the neighboring F4-type marker emanating signal 811 overshadows the F3-type marker emanating signal 814. Marker locator 1 then can indicate the presence of a possible erroneous marker detection and a weak F3-type marker hidden by the F4-type marker.

Figure 10:
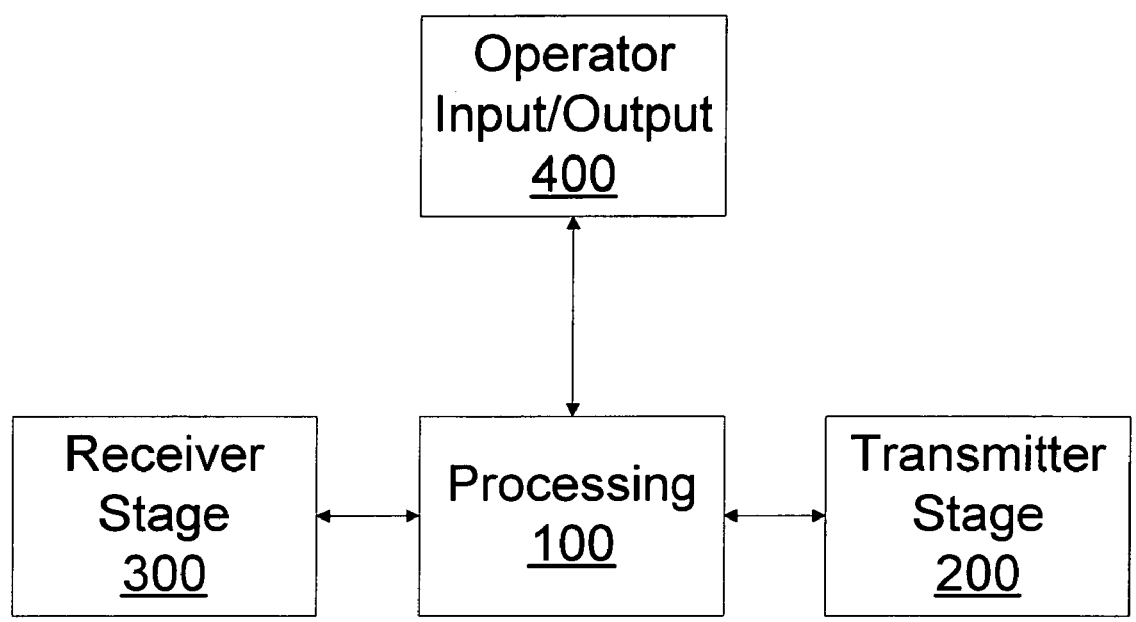
FIG. 10 shows a hardware overview block diagram of a marker locator according to the present invention.

FIG. 10 shows an embodiment of hardware block diagram of marker locator 1 according to the present invention. Marker locator 1 includes multiple subsystems: the processing subsystem 100, transmitter stage 200, receiver stage 300 and operator input/output 400. The processing subsystem 100 controls interaction among transmitter stage 200, receiver stage 300 and operator input/output 400. Each of the subsystems is further described below.

Operator input/output 400 contains devices necessary for accepting operator commands and control, as well as displaying information to the operator. Operator input/output 400 can include input and output devices such as, for example, combinations of keypad, keyboard, touch-screen, display, indicator and speaker units, as well as other input/output devices. The display, or equivalent output device, can show the received field strength of the marker, as well as the selected modes, the detected marker type and depth information, and additional appropriate information.

Figure 11A:
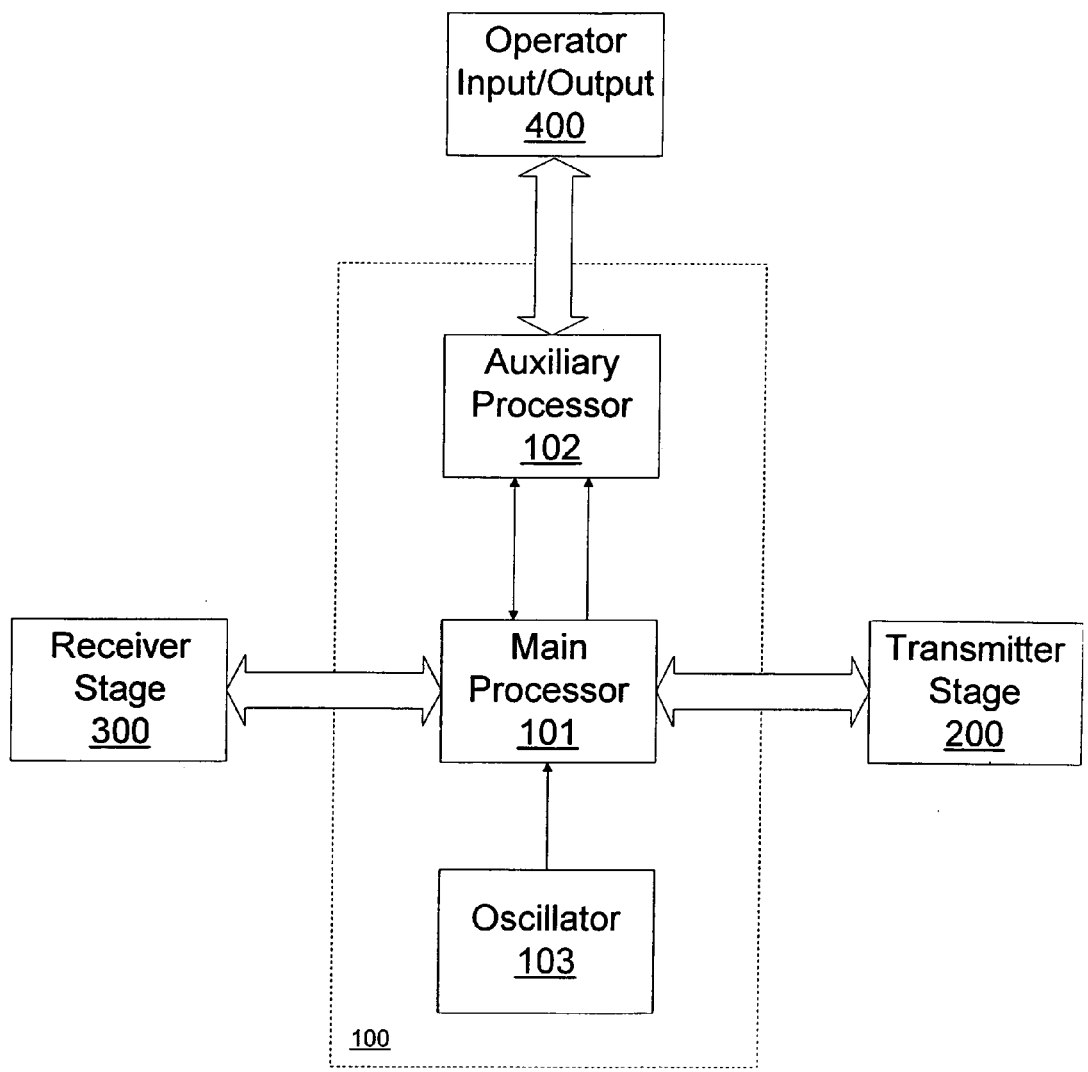
FIG. 11A shows a hardware block diagram of one embodiment of a processing subsystem according to the present invention.

FIG. 11A shows an embodiment of hardware block diagram of an embodiment of processing block 100 of FIG. 10. In the embodiment of FIG. 11A, processing has been divided between two processors: main processor 101 and auxiliary processor 102 that share the computational requirements of marker locator 1. For example, main processor 101 can control coordination among transmitter stage 200 of FIG. 10, receiver stage 300 of FIG. 10 and auxiliary processor 102. External oscillator 103 supplies timing reference signals to main processor 101. Auxiliary processor 102 then interacts with operator input/output 400.

In some embodiments of the present invention, main processor 101 can be a RISC microcontroller with serial interface capability, multiple Analog-to-Digital converter channels, and a hardware multiplier, such as the PIC17C44 manufactured by Microchip Technology Inc. (2355 W. Chandler Blvd., Chandler, Ariz. 85224).

In some embodiments of the present invention, auxiliary processor 102 can be a standard microcontroller with an integrated LCD driver module, serial interface capabilities and Analog-to-Digital converters, such as the PIC16C924 also manufactured by Microchip Technology. Generally, any number and type of processors capable of performing calculations for controlling marker locator 1 can be used.

In some embodiments, auxiliary processor 102 manages operator input, addresses a display, and drives a loudspeaker. In some embodiments, data from main processor 101 to auxiliary processor 102 is supplied via a serial link. Main processor 101 can generate a clock frequency, for example, from oscillator 103. While main processor 101 controls the stringent timing of the marker location transmit and receive sequence, auxiliary processor 102 manages the less stringent peripheral tasks in support of main processor 101.

Figure 11B:
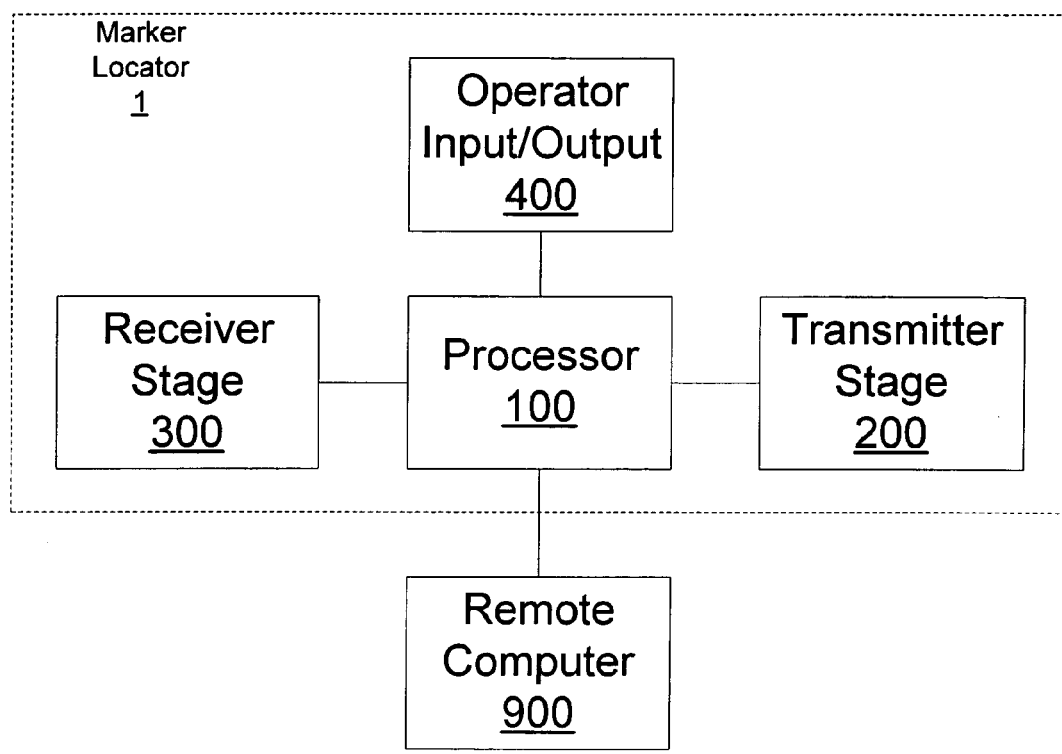
FIG. 11B shows a marker locator connected to a remote PC according to the present invention.

FIG. 11B shows a marker locator connected to a remote PC. In some embodiments, processor 100 provides one or more interfaces to external devices. An interface, for example, may be a serial or parallel, wired or wireless interface. Many interfaces, such as a direct serial interface, can be used to connect processor 100 to a remote computer 900. Remote computer 900 may be, for example, a laptop PC, PDA, tablet PC, handheld PC or desktop PC. Remote computer 900 can have additional resources for storage, processing and display of operator set parameters, current mode of operation, and frequency verses field strength measurements. Remote computer 900 can also be used for remote control of marker locator 1. Additionally, remote computer 900 can coordinate measurements and information from marker locator 1 with an external positioning sensors such as a GPS device.

Figure 12:
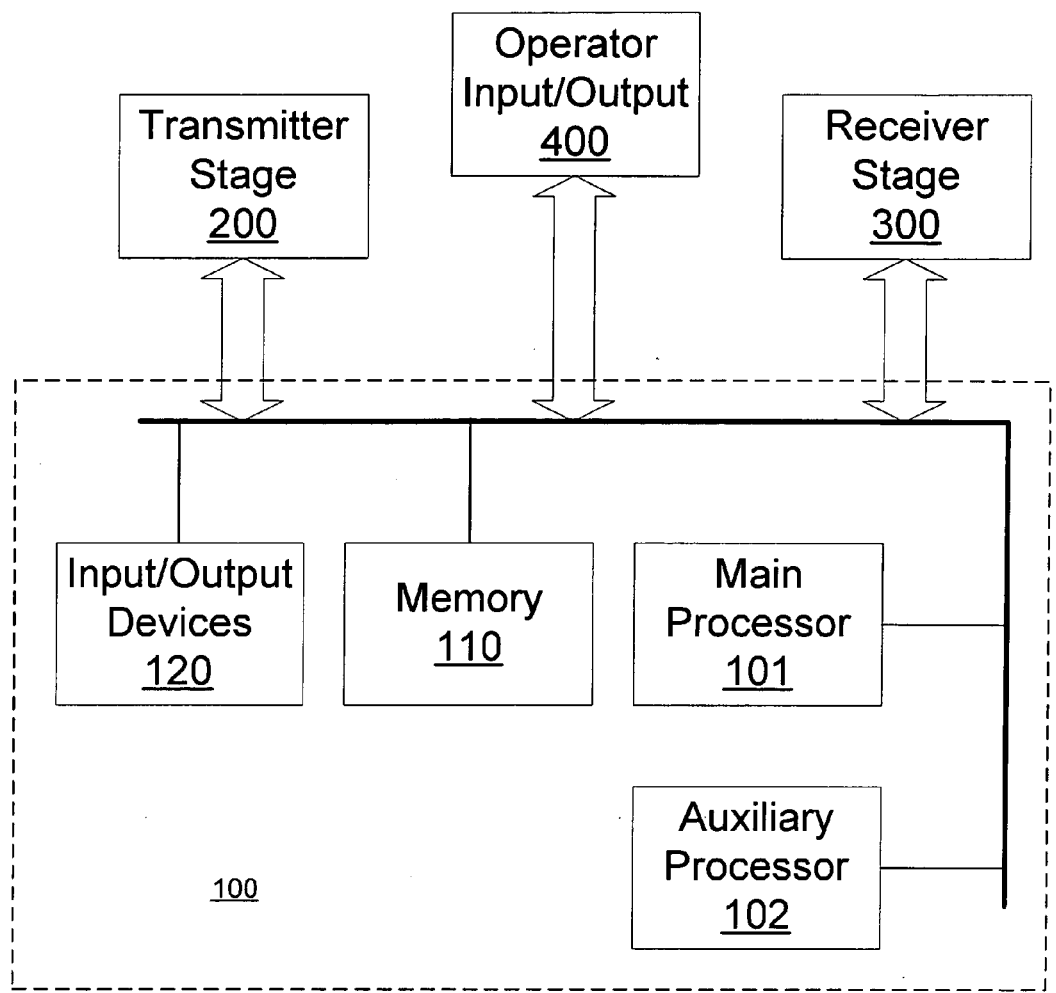
FIG. 12 shows a hardware block diagram of an alternate embodiment of a processing subsystem according to the present invention.

FIG. 12 shows a hardware block diagram of an alternate embodiment of a processing subsystem. In some embodiments, main processor 101 and auxiliary processor 102 can share memory 110 and input/output devices 120. Transmitter stage 200, receiver stage 300 and operator input/output 400 can have direct or indirect access to processing 100 via shared bus lines.

Figure 13:
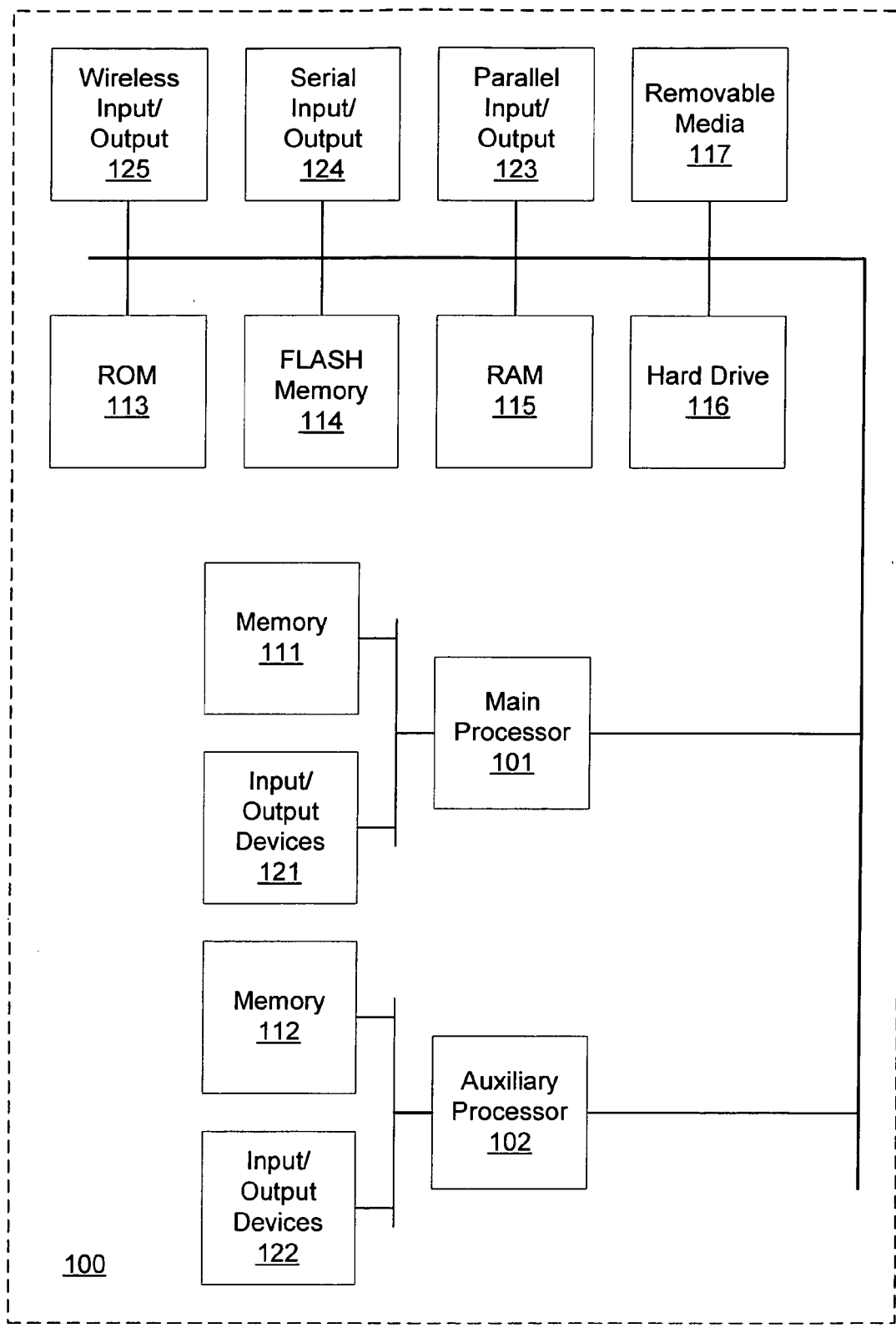
FIG. 13 shows a hardware block diagram of another embodiment of the Processing Subsystem including both shared and dedicated hardware.

FIG. 13 shows a hardware block diagram of another embodiment of the Processing Subsystem including both shared and dedicated hardware. Processing subsystem 100 may include shared volatile and non-volatile storage such as ROM 113, Flash memory 114, RAM, 115, hard drive 116 and removable media 117. Processing subsystem 100 may also include shared wireless input/output interface 125 (e.g., RF, infrared or optical interface), serial input/output 124, and parallel input/output 123. External interfaces allow connection to external devices, for example, to external storage, to printers, to GPS positioning devices, to command and control devices, to client computers, and to master and slave computers. Interfaces 125, 124 and 123 can be used to by-pass operator input/output 400. Main processor 101 can still have dedicated memory 111 and input/output devices 121. Auxiliary processor 102 can also have dedicated memory 112 and input/output devices 122.

In some embodiments, location technician 6 selects multiple modes of operation with a keyboard, keypad, touch screen or a similar input device. Modes include, for example: (1) modes to seek an individual service marker type (e.g., gas markers alone); (2) modes to seek a set of service markers (e.g., just sewage and water markers); (3) modes to scan for any and all detectable markers; (4) modes to determine depth measurements; and (5) modes to operate with high gain. Input devices can also be utilized to initiate calculations or perform other queries of auxiliary processor 102.

Figure 14A:
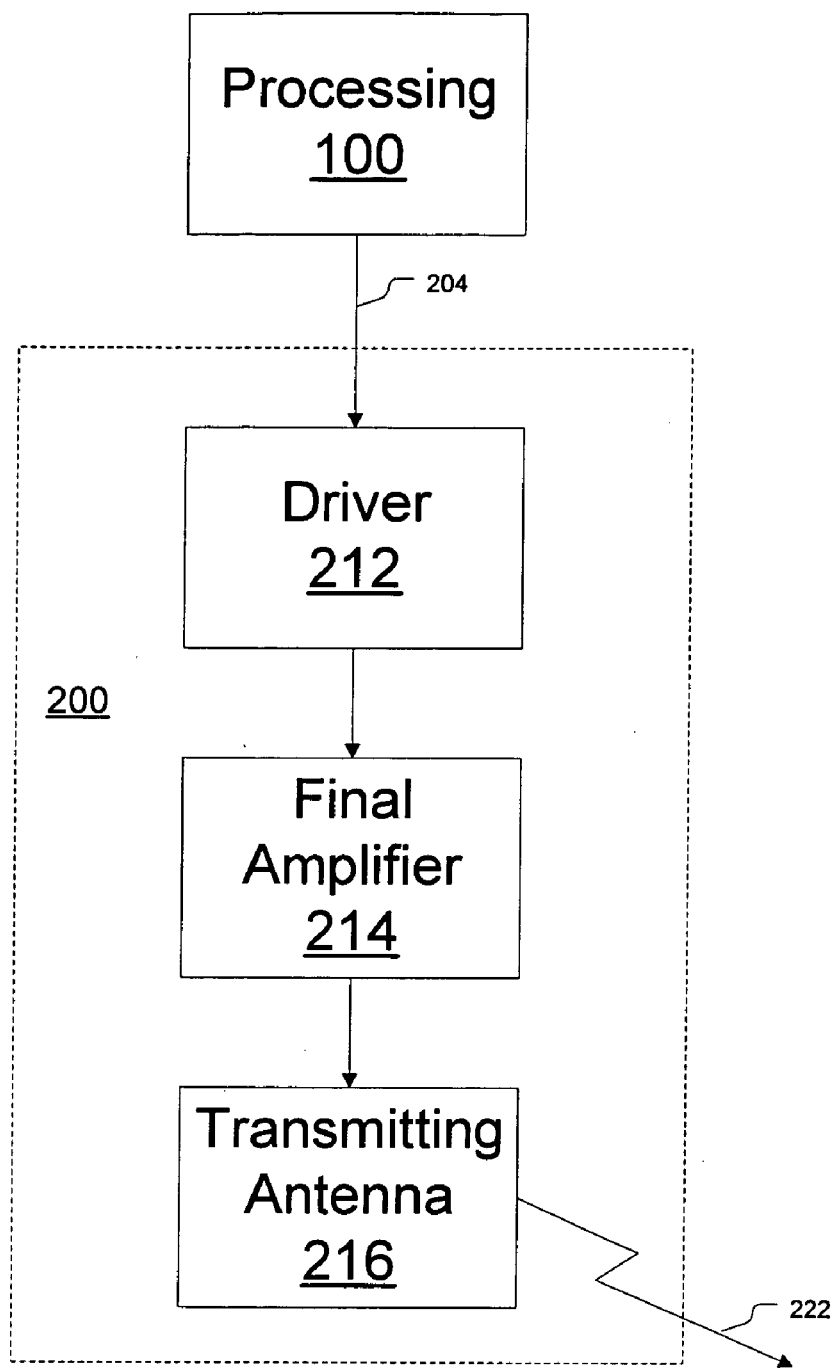
FIG. 14A shows a hardware block diagram of a transmitter stage of a marker locator according to the present invention.

FIG. 14A shows a hardware block diagram of transmitter stage 200 of FIG. 10. Main processor 101 of FIG. 11A incorporates the functions of a digital-to-analog converter (DAC) and of a voltage controlled oscillator (VCO) thereby providing an analog excitation signal 204 directly to transmitter stage 200. Driver 212 initially amplifies analog excitation signal 204. Driver 212 provides the amplified output to final amplifier 214 for a second amplification. Final amplifier 214 can be controlled by processing 100 to control gain during transmit pulse period and to shutdown transmission during the pause between pulses. Final amplifier 214 output signal is transmitted via transmitting antenna 216. Transmitting antenna 216 transmits transmitted electromagnetic radiation.

Figure 14B:
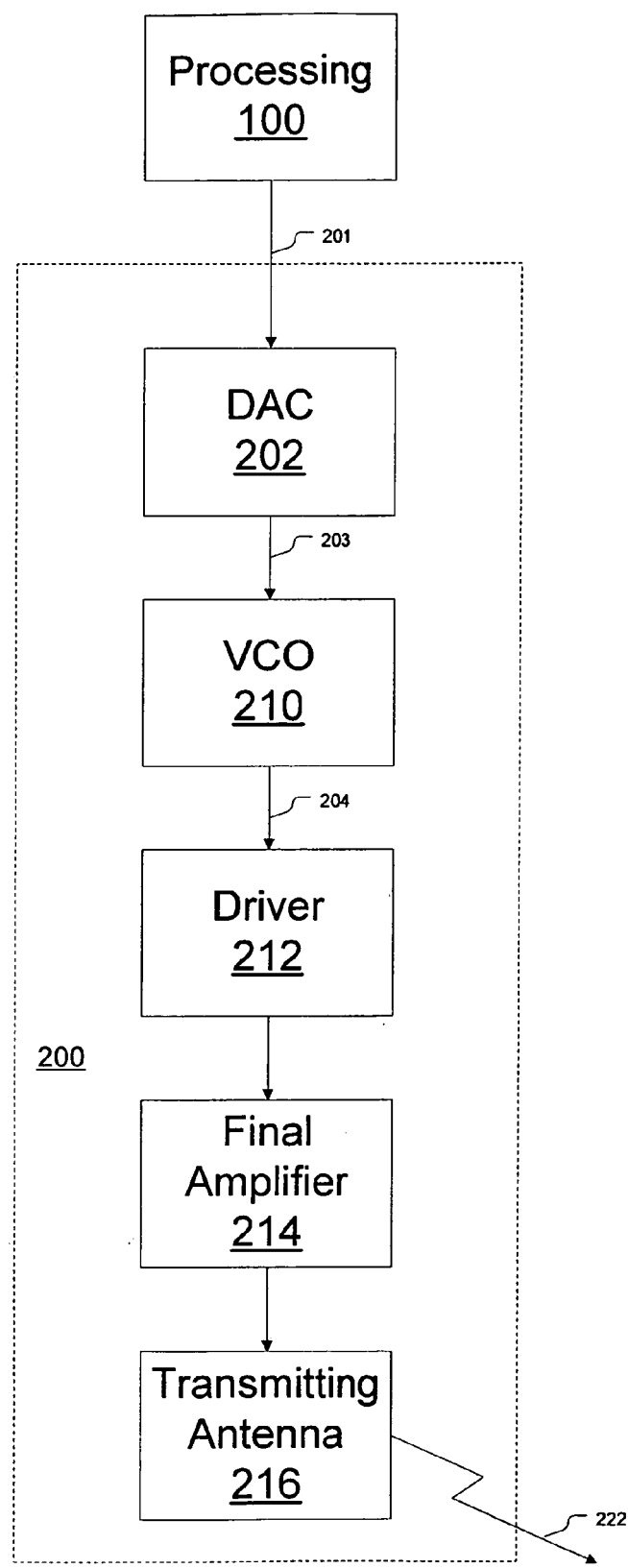
FIG. 14B shows another hardware block diagram of a transmitter stage of a marker locator according to the present invention.

FIG. 14B shows another hardware block diagram of transmitter stage 200 of FIG. 10. Alternatively, main processor 101 of FIG. 11A provides a digital value 201 representing the excitation frequency to a digital-to-analog converter (DAC) 202. DAC 202 creates an analog excitation voltage 203. Voltage controlled oscillator (VCO) 210 converts analog excitation voltage 203 from DAC 202 into analog excitation signal 204. Alternatively, processor 100 can incorporate the function of DAC 202, thus providing an analog excitation voltage 203 directly to transmitter stage 200.

Figure 1:
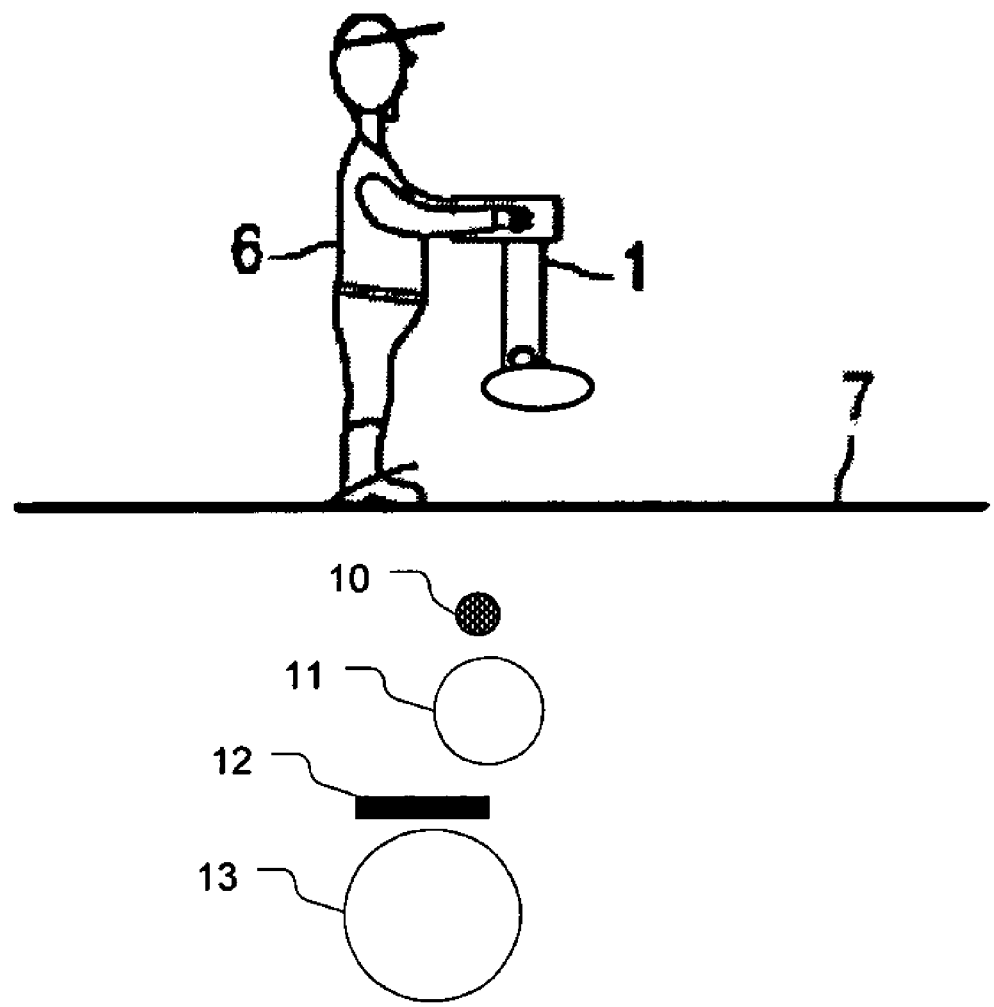
FIG. 1 illustrates a marker locator in operation by a location technician.
Figure 14C:
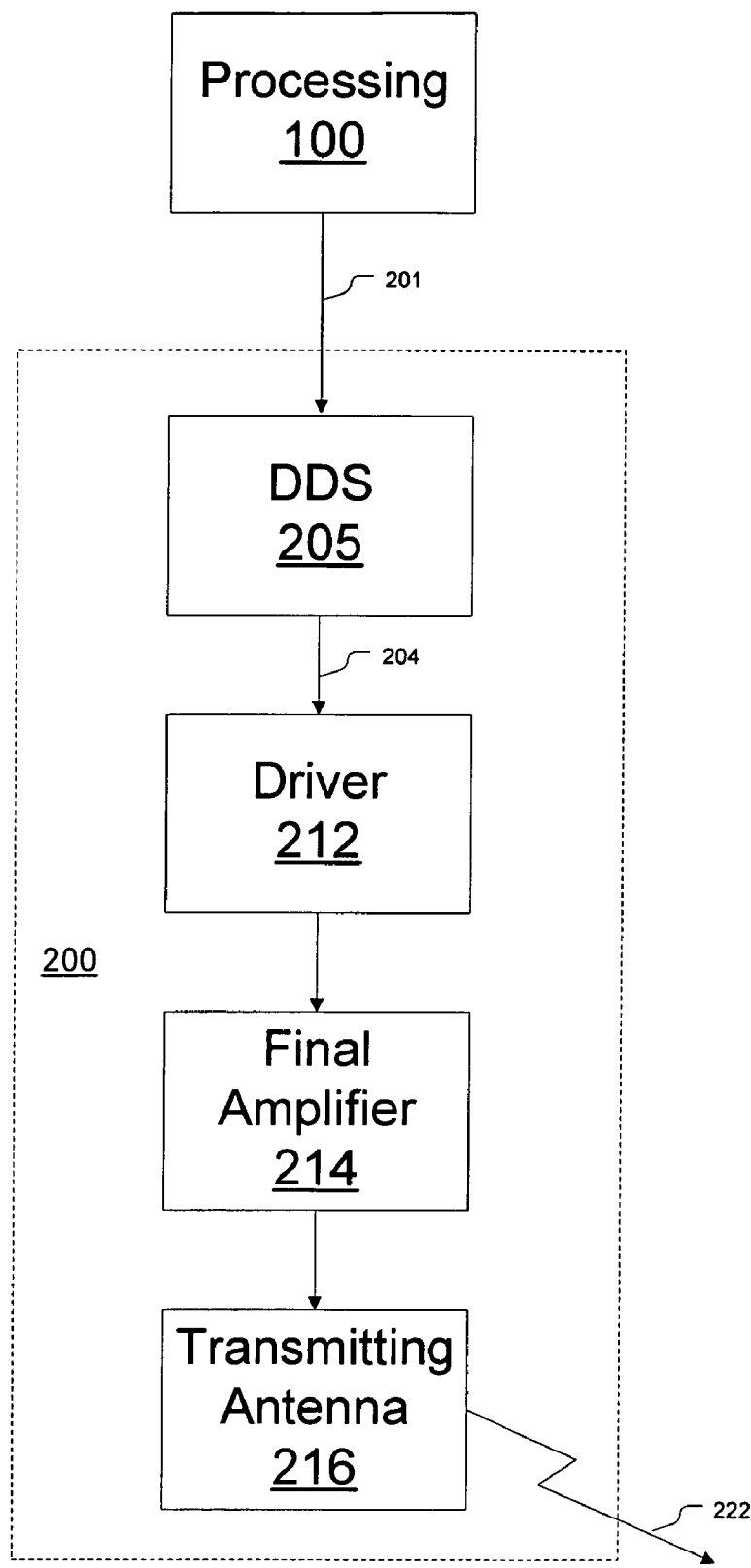
FIG. 14C shows yet another hardware block diagram of a transmitter stage of a marker locator according to the present invention.

FIG. 14C shows yet another hardware block diagram of transmitter stage 200 of FIG. 10. Alternatively, main processor 101 of FIG. 1A provides digital value 201 representing the excitation frequency to a direct digital synthesizer (DDS) 205. DDS 205 is a programmable device that integrates the functionality of DAC 202 and VCO 210 into a single component. DDS 205 uses direct digital synthesis, which generates a frequency and phase tunable output signal referenced to a fixed frequency from a precision reference clock source. DDS 205 divides down the reference clock signal to provide analog excitation signal 204.

The excitation frequency is based on the sought after marker resonant frequency. If, for example, marker locator 1 seeks to find all power cable-type markers, converter 210 provides a 169.8 kHz excitation frequency signal to driver 212. Transmit signal 222 emanates from marker locator 1 to activate markers.

In some embodiments of the present invention, transmitting antenna 216 is a loop antenna mounted on base 30 of marker locator 1. Transmitting antenna 216 creates an electromagnetic field that excites the resonant circuit of a marker. In some embodiments, transmitting antenna 216 is a coil-type antenna. Those skilled in the art know that a variety of antenna designs are available to perform as transmitting antenna 216.

Figure 15:
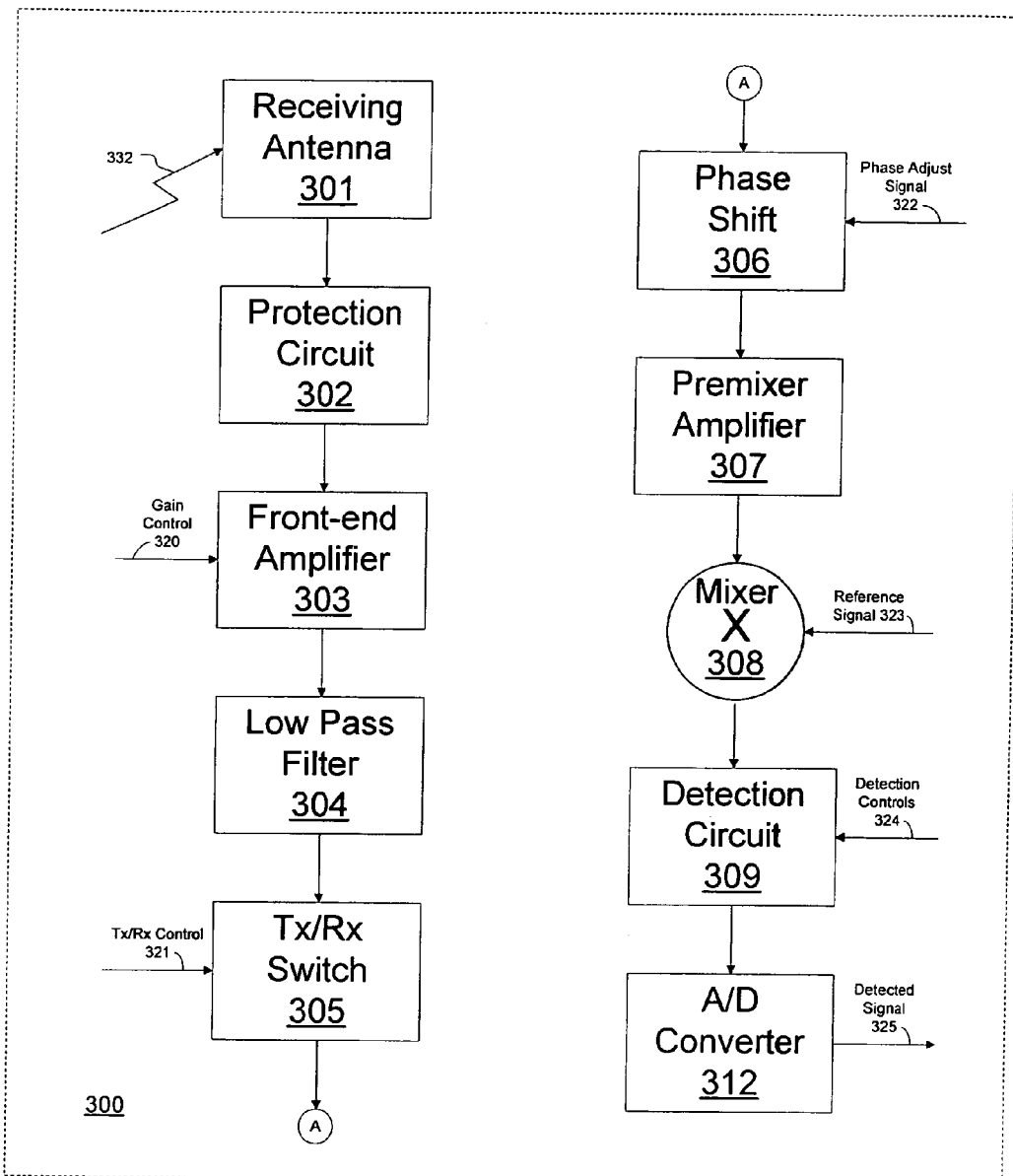
FIG. 15 shows a hardware block diagram of a receiver stage according to the present invention.

FIG. 15 shows a hardware block diagram of an embodiment of receiver stage 300 of FIG. 10. Receiving antenna 301 receives emitted signal 332 from a nearby passive marker. The passive marker's emitted signal 332 includes received signal 334, which consists of the decaying electromagnetic fields that emanate from the markers during the pause between marker locator 1 transmissions. In some embodiments, receiving antenna 301 includes a ferrite rod antenna coil that is mounted centrally within transmitting antenna 216 of FIG. 14A. Alternatively to high permeability ferrite, a powdered iron magnetic material may be used. Receiving antenna 301 is coupled, by way of protection circuit 302, to front-end amplifier 303. Protection circuit 302 aids in curtailing overload and damage to receiver stage 300. In some embodiments, main processor 101 of FIG. 11A provides gain control 320 to front-end amplifier 303 to adjust for differences in signal level caused by different laying depths of markers.

The output of front-end amplifier 303 is filtered by low pass filter 304 to reduce the noise bandwidth. Low pass filter 304, through AC coupling and the inherent high pass characteristics of the coil antenna, functionally operates as a band pass filter.

The output of filter 304 is directed through Tx/Rx switch 305, a self-biasing circuit used to limit transmitter signal 222 of FIG. 14A that can be coupled to the received signal 334. Since transmitted signal 222 is typically much stronger than the received signal 334 generated by the subterranean markers, Tx/Rx switch 305 is used to mute input to the down stream components of receiver stage 300. Muting occurs when transmit stage 200 is active. Muting also helps to prevent saturation in receiver stage 300 and shortens recovery time. Main processor 101 of FIG. 11A provides Tx/Rx control 321 to Tx/Rx switch 305 to engage and disengage muting.

Phase shift 306 adjusts the zero phase of the signal from switch 305. Phase shift 306 permits adjustment of the phase to compensate for accumulated phase error. By compensating for accumulated phase error, receiver stage 300 provides higher receiver sensitivity in amplifier 303 and switch 305 of the receiver 300. Phase error accumulates along the entire loop, from transmitter signal generation in the transmitter chain, through the transmitter antenna, back through the receiver antenna, to the receive chain up to mixer 308. Phase error is also introduced from variations among individual components.

The output signal from phase shift 306, with the corrected phase, is then coupled into premixer amplifier 307, whose output signal in turn is coupled into mixer 308. Mixer 308 demodulates the output signal of premixer amplifier 307 by mixing in a reference signal 323 provided by processor 100 of FIG. 11A. The resulting mixed signal is demodulated to base band or near base band. The resulting output signal of mixer 308 is fed to detection circuit 309.

Figure 16:
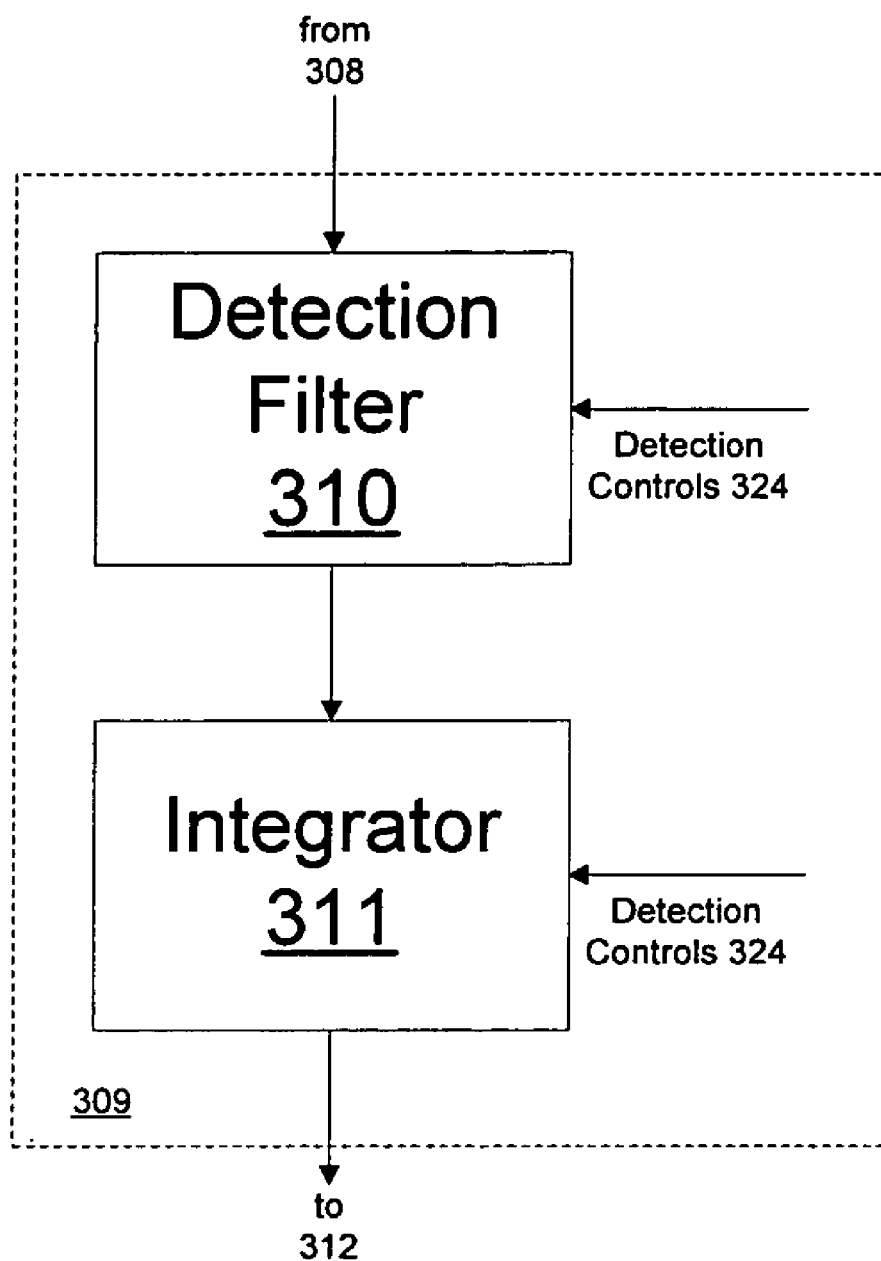
FIG. 16 shows a hardware block diagram of a detection circuit of the receiver stage shown in FIG. 15.

FIG. 16 shows an embodiment of a detection circuit 309 comprising detection filter 310, for example, a low pass filter, followed by an integrator 311. Processor 100 of FIG. 11A can provide detection control 324 to integrator 311 to initiate and halt detection between pulses 223.

The output signal of detection circuit 309 can be routed to Analog-to-Digital (A/D) converter 312 with offset addition for bipolar digitization. The output signal of converter 312 can be provided to processor 100. In some embodiments, the detection can be performed digitally by using converter 312 to convert the analog signal from either premixer amplifier 307 or the output of mixer 308. With a digital signal, software or firmware within the processing subsystem 100 can perform the functions of mixer 308 and detection circuit 309.

By implementing many of the signal processing functions in software, marker locator 1, according to some embodiments of the present invention, is flexible in its transmitting and tuning capabilities. As a result of the electronic software generation of marker frequencies, main processor 101 of FIG. 11A can rapidly cycle among discrete marker resonant frequencies or sets of discrete marker frequencies. The scanning time is limited by the response time of the markers and the desired noise reduction.

Flexible digital architecture allows marker locator 1 the versatility to incorporate various scanning features. In scanning modes marker locator 1 reprograms transmitter stage 200 and receiver stage 300 of FIG. 10 to operate at discrete frequency or combinations of frequencies automatically. In areas with multiple types of buried markers, location technician 6 can more efficiently, accurately and thoroughly perform a search of the area of concern.

Figure 17:
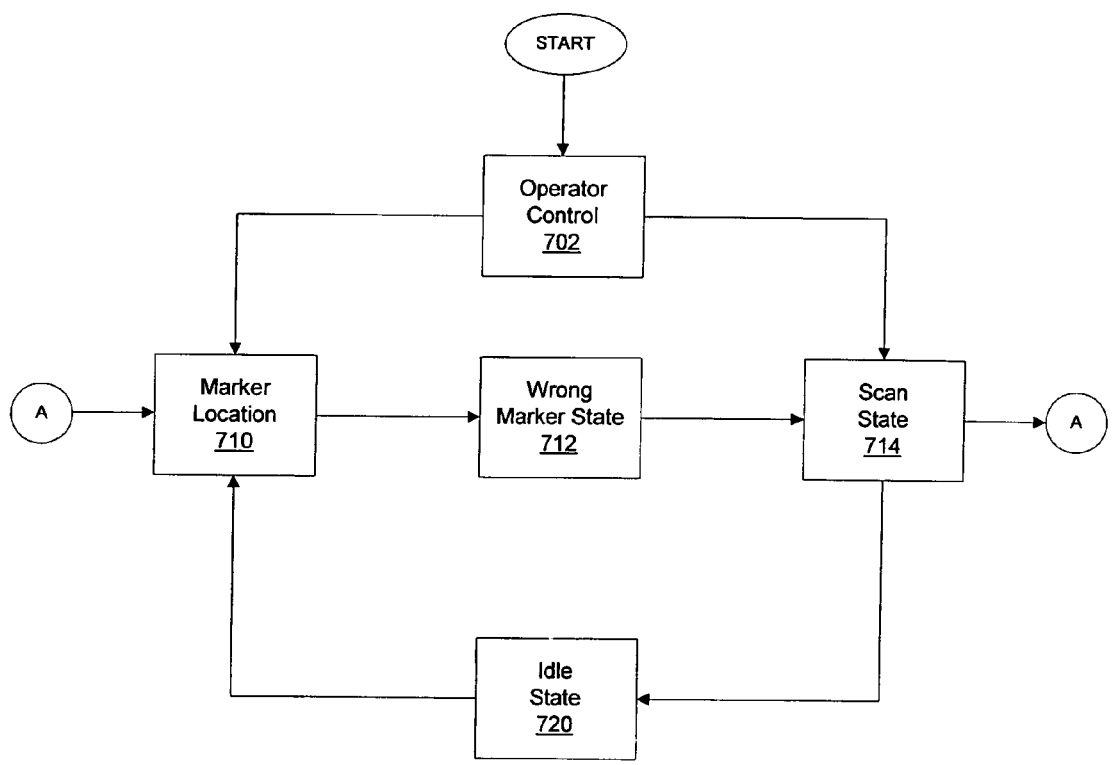
FIG. 17 shows a software state transition diagram according to the present invention.

FIG. 17 shows a software mode state diagram. In some embodiments, marker location technician 6 can enable or disable scan software features. The operation of marker locator 1 starts with input from location technician 6. Operator control 702 waits for and accepts location technician 6 input. A search for a single marker type invokes marker location state 710. A search for multiple marker types invokes scan state 714 that invokes marker location 710 multiple times. When a wrong marker is detected, marker locator 1 can enter the wrong marker state 712 and alert location technician 6. In some embodiments, once the marker scan has been completed in one location, marker locator 1 waits in idle state 720 until location technician 6 triggers the beginning of the next scan cycle.

Figure 18:
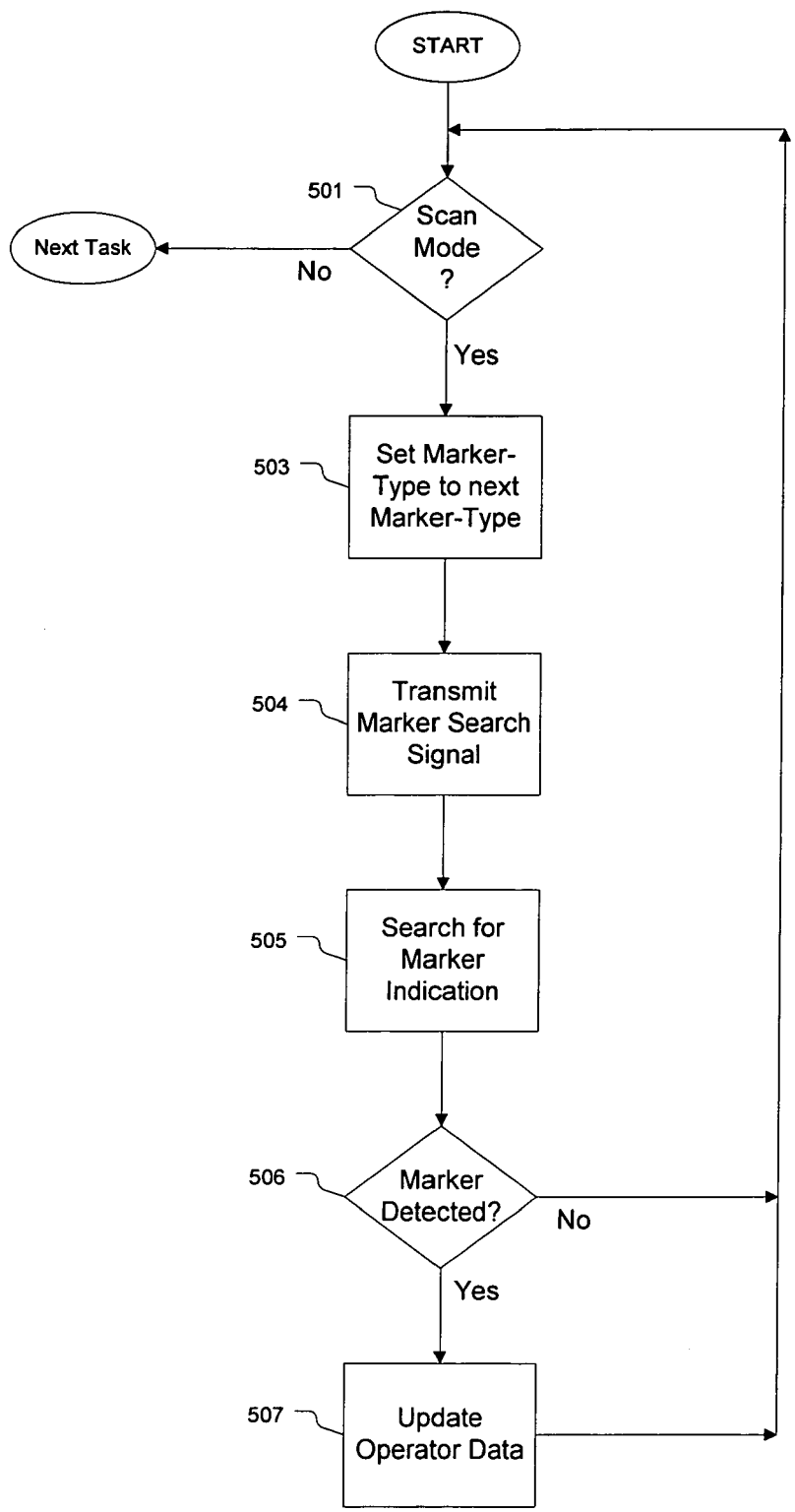
FIG. 18 shows a software flow chart of a scan mode algorithm operating on a marker locator system shown in FIG. 10 according to the present invention.

FIG. 18 shows a software block diagram of the scan mode. Main processor 101 of FIG. 11A determines the status of scan mode 501. If set for automatically scanning, the processor advances the marker type 503 to be searched to the next on the list, transmits the appropriate marker search signal 504, then searches 505 for an indication of the presence of a marker. In step 506, if a marker has been detected, marker locator 1 updates operator data 507 displayed to location technician 6.

By incorporating a mode to automatically scan for more than one type of marker, location technician 6 speeds detection of all markers and is not forced to manually cycle through each marker type. Instead of setting a marker type, performing a manual sweep of the area, then repeating the process, location technician 6 simply sets marker locator 1 to scan, and performs a single sweep of the area. Thus, the scan mode of the present invention eliminates the need to repeat the manual sweep for each marker type.

Figure 19:
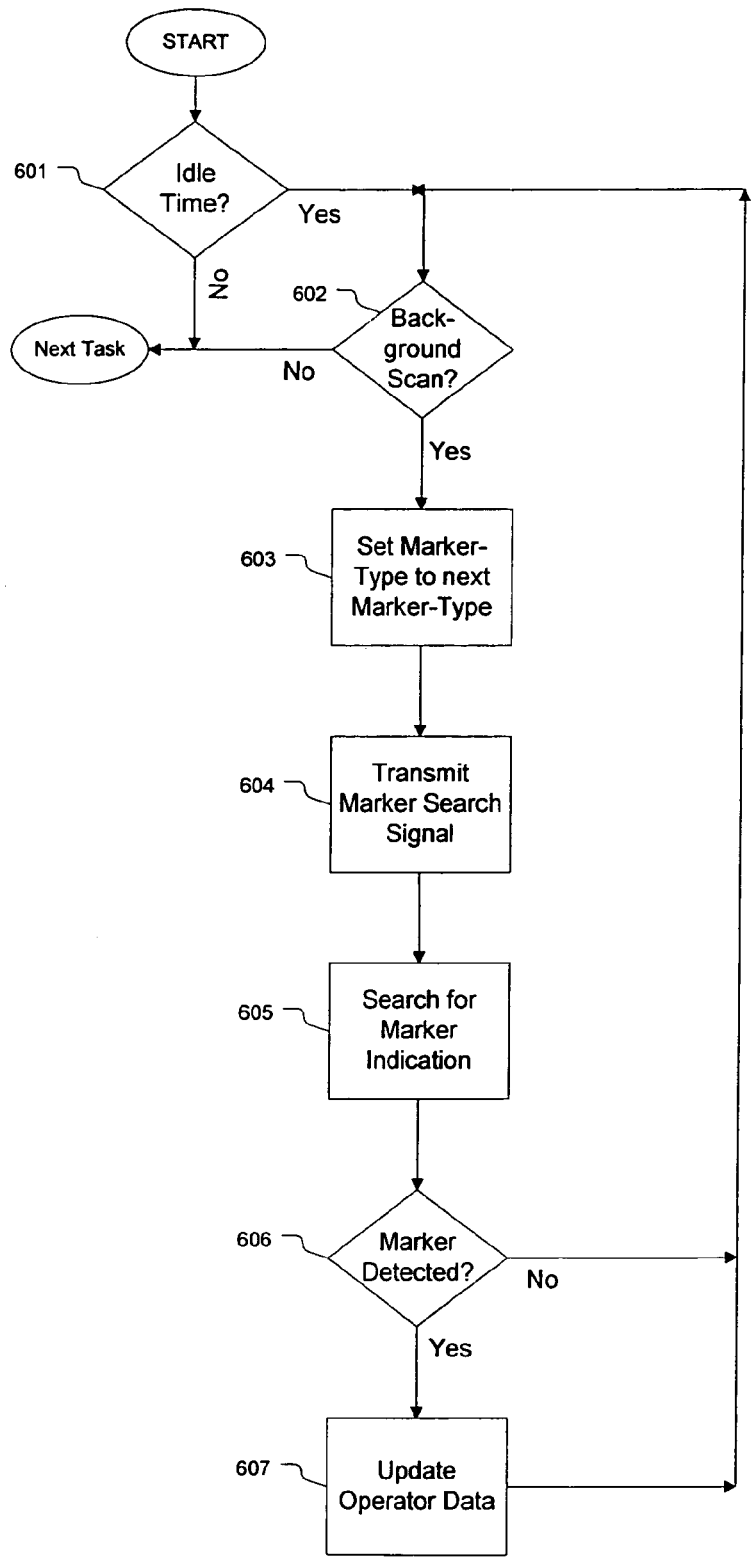
FIG. 19 shows a software block diagram of the background-scan feature operating on a marker locator system shown in FIG. 10.

FIG. 19 shows a software block diagram of the background-scan feature. The background-scan feature is similar to the operator selected scan mode described above. With the scan mode, location technician 6 sets the scan frequencies to scan. With the background-scan feature, marker locator 1 selects frequencies the technician is not seeking.

In some embodiments, background scanning can be initiated based on one or a combination of: (1) the idle times of marker locator 1; (2) a time schedule; (3) signals detected by marker locator 1; and (4) depth measurements. Background scanning can be initiated based on idle times of mark locator 1. During idle times 601, when the background-scan feature is enabled 602, marker locator 1 will utilize the time in between other operations to perform a scan for "other" markers. Again, the processor advances the marker type to be searched to the next on the list 603, transmit the appropriate marker search signal 604, and then searches for an indication of the presence of a marker 605. In step 606, if a marker has been detected, marker locator 1 updates its operator data 607 displayed to location technician 6.

In some embodiments, background scanning can be initiated based on a time schedule. For example, location technician 6 defines a list of enumerated marker types to search. Marker locator 1 translates the enumerated marker types into resonant frequencies. Marker locator 1 then begins searching for markers. Marker locator 1 scans for enumerated marker types. Every N seconds, marker locator 1 interrupts the current search for enumerated marker types to search all non-enumerated marker types. Non-enumerated marker types are all of the marker types not included in the enumerated marker type list. Upon completion of the non-enumerated marker type search, marker locator 1 continues with the enumerated marker type search until another N seconds pass.

In some embodiments, background scanning can be initiated based on signals detected by marker locator 1. For example, location technician 6 defines a list of enumerated marker types to search. Marker locator 1 translates the enumerated marker types into resonant frequencies. Marker locator 1 then begins searching for markers. Marker locator 1 scans for enumerated marker types. If a marker from the enumerated marker type is potentially detected, then marker locator 1 interrupts the current search for enumerated marker types to search all non-enumerated marker types. A marker type is potentially detected when marker locator 1 detects a signal at the resonant frequency of a marker type above a set detection threshold. Marker locator 1 can internally set or location technician 6 can configure the detection threshold. Upon completion of the non-enumerated marker type search, marker locator 1, continues with the enumerated marker type search until marker locator 1 makes another measurement above the detection threshold.

In some embodiments, background scanning can be initiated based on depth measurements. If known, location technician 6 can set the estimated marker depth, thereby, calibrating the received signal strength from markers at the estimated marker depth. When location technician 6 begins a depth measurement, marker locator 1 can first perform a background scan for non-enumerated marker types. If marker locator 1 detects a non-enumerated marker type, marker locator 1 can signal an alarm to location technician 6, thereby helping to assure that location technician 6 does not take inaccurate measurement data.

In some embodiments, the concept of the background-scan feature is also applicable to the "wrong marker alert" feature. Depending on the dynamic range of the receiver, the band stop suppression of the receiver is limited. As describe earlier, a marker at a short distance away from marker locator 1 that is not being searched for may show up as a detected marker of a different type. When searching for a first type of marker, a marker of a second type near the receiver may saturate the receiver searching for markers of the first type.

In some embodiments, the purpose of the "wrong marker alert" feature is to aid in the prevention of an erroneous indication of a buried marker of a particular type when a marker of another type is found. Marker locator 1 uses its software based frequency generator to quickly scan all defined marker frequencies in the background. When location technician 6 selects a dedicated frequency (e.g., cable TV markers at 77.0 KHz), marker locator 1 scans the other frequencies in the background without notice to the technician. If marker locator 1 detects a neighboring type marker during the background scan, marker locator 1 determines if a potential erroneous indication has been given before providing a "wrong marker alert" warning to the technician.

In some embodiments, when a "wrong marker" has been detected, marker locator 1 device notifies the technician. The technician may act on the "wrong marker" indication by performing a search for other individual types of markers, or may engage the scan mode to search for multiple marker types simultaneously.

The attached CD-ROM Appendix A, herein incorporated by reference, contains two files: M-1200~1.TXT and M-1200~2.TXT. The M-1200~1.TXT file includes assembly language programs for a Microchip Technology PIC16C924 auxiliary processor to performing display, keypad, keyboard and related functions. The M-1200~2.TXT file includes assembly language programs for a main processor on a Microchip Technology PIC17c44 microcontroller. Appendix B, herein incorporated by reference, contains a list of the files included on the CD-ROM.

The above-described embodiments of the invention are exemplary only. One skilled in the art may deduce various modifications to the embodiments described here which are intended to be within the scope of this invention. As such, the invention is limited only by the following claims.

APPENDIX B

Volume in drive D is 011212_0949

Volume Serial Number is 2CBA-618D

Directory of D:\

Dec. 12, 2001 09:49a <DIR>

Dec. 12, 2001 09:49a <DIR>

Dec. 10, 2001 12:23p 118,445 M-1200~1.TXT

Dec. 10, 2001 11:34a 101,504 M-1200~2.TXT
    4 File(s)
       219,949 bytes
       0 bytes free

We claim:

1. A marker locator, comprising:
  a transmitter stage that controllably radiates transmitted electromagnetic radiation at one or more frequencies, each frequency corresponding to a particular marker type;
  a receiver stage that controllably detects electromagnetic radiation received at one or more frequencies; and
  a processor electrically coupled to the transmitter stage and the receiver stage,
  wherein the marker locator automatically scans through a selected set of the plurality of frequencies in response to signals from the processor to detect markers of the plurality of marker types.

2. The marker locator of claim 1, wherein:
  the transmitter stage comprising a transmitting antenna; and
  the receiver stage comprising a receiving antenna.

3. The marker locator of claim 2, wherein the transmitting antenna and the receiving antenna are integrated into a combined transmitting/receiving antenna.

4. The marker locator of claim 1, wherein the processor comprising a main processor and an auxiliary processor.

5. The marker locator of claim 1, wherein the processor includes software instructions stored in a memory, the software instructions to control the transmitter stage and the receiver stage.

6. The marker locator of claim 5, wherein the processor executes software instructions for a foreground-scan mode.

7. The marker locator of claim 5, wherein the processor executes software instructions for a background-scan mode.

8. The marker locator of claim 5, wherein the processor executes software instructions for neighbor-detection.

9. The marker locator of claim 1, wherein the transmitted electromagnetic radiation is one or more transmitted pulses of electromagnetic radiation, wherein:
  each one of the transmitted pulses comprising a first sinusoidal wave of a first frequency; and
  each one of the transmitted pulses is followed by a pause.

10. The marker locator of claim 9, wherein each one of the transmitted pulses further comprising a second sinusoidal wave of a second frequency.

11. The marker locator of claim 1, wherein the transmitter stage comprising:
  a driver coupled to an analog excitation signal from the processor to generate an output signal in response to the analog excitation signal; and
  a transmitting antenna to radiate the transmitted electromagnetic radiation in response to the output signal.

12. The marker locator of claim 11, wherein the transmitter stage further comprising:
  a final amplifier coupled between the driver and the transmitting antenna to amplify the output signal from the driver providing a final amplified signal to the transmitting antenna.

13. The marker locator of claim 11, wherein the transmitter stage further comprising:
  a voltage controlled oscillator coupled to an analog excitation voltage from the processor to generate the analog excitation signal for the driver.

14. The marker locator of claim 13, wherein the transmitter stage further comprising:
  a digital-to-analog converter coupled to a digital value from the processor to convert the digital value to the analog excitation voltage for the voltage controlled oscillator.

15. The marker locator of claim 11, wherein the transmitter stage further comprising:
  a direct digital synthesizer coupled to receive a digital value from the processor and to provide an analog excitation signal to the driver.

16. The marker locator of claim 1, wherein the receiver stage comprising:
  a receiving antenna for receiving the received electromagnetic radiation; and
  a detection circuit coupled between the receiving antenna and the processor, the detection circuit to generate and provide to the processor a detected signal.

17. The marker locator of claim 16, wherein the receiver stage further comprising:
  a front-end amplifier coupled to the receiving antenna to amplify the received electromagnetic radiation to a first amplified received signal.

18. The marker locator of claim 16, wherein the detection circuit comprising:
  a detection filter and an integrator;
  the detection filter to pass energy received from a marker to the integrator; and
  the integrator to integrate the passed energy and to pass a detected signal indication to the processor to indicate whether the marker is detected.

19. A marker locator comprising:
  a base subsection including a transmit antenna and a receive antenna;
  a shaft coupled to the base subsection;

a top assembly coupled to the shaft, wherein the top assembly includes a control panel, the control panel includes a display screen and input buttons; and electronic circuitry mounted in the base subsection, the shaft and the top assembly, wherein the electronic circuitry includes:
- a transmitter stage including a transmitting antenna;
- a receiver stage including a receiving antenna; and
- a processor electrically coupled to the transmitter stage and to the receiver stage, wherein the processor controls the transmitter stage and the receiver stage to automatically transmit a selected set of particular frequencies and then receive a selected set of particular frequencies.

20. The marker locator of claim 19, wherein the transmitting antenna and the receiving antenna are integrated into a combined transmitting/receiving antenna.

21. The marker locator of claim 19, wherein the processor includes:
- a main processor coupled to the transmitter stage and to the receiver stage; and
- an auxiliary processor coupled to the display screen and to the input buttons.

22. The marker locator of claim 19, further comprising a remote access port coupled to the electronic circuitry for connection to by a remote computer to allow remote command and control of the marker locator.

23. A marker locator, comprising:
- means for scanning a set of a plurality of marker frequencies;
- means for generating a transmit pulse at a particular frequency of the set of the plurality of marker frequencies;
- means for transmitting the transmit pulse; and
- means for receiving responses at the particular frequency from one or more markers.

24. The marker locator of claim 23, further comprising: means for detecting a first marker response appropriate for the first marker type.

25. The marker locator of claim 23, further comprising: means for controlling a processor.

26. A method of locating markers comprising:
- transmitting a first pulse, the first pulse including a sinusoidal wave of a first frequency appropriate for a first marker type;
- receiving responses from one or more markers at the first frequency;
- detecting a first marker response appropriate for the first marker type;
- transmitting a second pulse, the second pulse including a sinusoidal wave of a second frequency appropriate for a second marker type, wherein the second marker type is of a different marker type than the first marker type;
- receiving responses from one or more markers at the second frequency; and
- detecting a second marker response appropriate for the second marker type.

27. The method of locating markers of claim 26, wherein transmitting the second pulse occurs at least in part while detecting the first marker response.

28. A method of locating markers including:
- performing a primary scan with a first set of sinusoidal waves of a first set of frequencies appropriate for a first set of marker types; and
- performing a background scan with a second set of sinusoidal waves of a second set of frequencies appropriate for a second set of marker types.

29. The method of locating markers of claim 28, wherein the primary scan and background scan each comprising:
- selecting a set of frequencies from a plurality of marker frequencies; and
- for each one of the set of selected frequencies:
  - setting a current frequency to the one of the set of selected frequencies;
  - transmitting a pulse at the current frequency;
  - receiving a plurality of marker responses on the current frequency; and
  - detecting a marker response.

30. The method of locating markers of claim 28, wherein selecting the set of primary frequencies from the plurality of marker frequencies is performed by a user.

31. The method of locating markers of claim 28, wherein the set of background frequencies selected from the plurality of marker frequencies includes neighboring marker frequencies.

32. The method of locating markers of claim 28, wherein the set of background frequencies selected from the plurality of marker frequencies includes a complete set of the plurality of marker frequencies.

33. The method of locating markers of claim 28, wherein the marker locator invokes the background scan based on one or more of:
- (a) a time schedule, wherein the marker locator periodically interrupts the primary scan to perform the background scan;
- (b) a signal received, wherein the marker locator interrupts the primary scan to perform the background scan when the signal received surpasses a receive threshold;
- (c) a detected marker, wherein the marker locator interrupts the primary scan to perform the background scan if the detected marker is detected; and
- (d) a depth measurement, wherein the marker locator interrupts the primary scan to perform the background scan if the depth measurement is set.

34. An underground marker locator, comprising:
- a transmitter adapted to transmit a set of frequencies, each of the set of frequencies corresponding with the resonant frequency of an underground marker type;
- a receiver adapted to receive the set of frequencies; and
- a processor coupled to the transmitter and the receiver, wherein the processor scans through a subset of the set of frequencies to determine the presence of one or more underground marker types.

35. A locator as in claim 34, wherein the processor determines the contribution at each frequency of the subset of frequencies from underground markers with neighboring resonant frequencies in the set of frequencies.

36. A locator as in claim 34, wherein the processor further scans a second subset of the set of frequencies that is not included in the subset of the set of frequencies for underground marker types with resonant frequencies closest to the subset of the set of frequencies.

37. A locator as in claim 34 wherein the subset of the set of frequencies is chosen by an operator.

* * * * *